(12) United States Patent
Kakutani

(10) Patent No.: US 8,619,281 B2
(45) Date of Patent: Dec. 31, 2013

(54) DEVICE CAPABLE OF EXTRACTING COPY PROHIBITION INFORMATION AND CONTROL METHOD THEREOF

(75) Inventor: Naoya Kakutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 13/159,751

(22) Filed: Jun. 14, 2011

(65) Prior Publication Data

US 2011/0317201 A1      Dec. 29, 2011

(30) Foreign Application Priority Data

Jun. 25, 2010   (JP) .................. 2010-145435

(51) Int. Cl.
*G06K 15/00*     (2006.01)
*G06F 3/12*      (2006.01)

(52) U.S. Cl.
USPC .......... 358/1.14; 358/1.15; 358/1.13

(58) Field of Classification Search
None
See application file for complete search history.

(56) References Cited

U.S. PATENT DOCUMENTS

| | | | |
|---|---|---|---|
| 6,548,768 B1 | 4/2003 | Pettersson et al. | |
| 7,800,771 B2 * | 9/2010 | Koike et al. .................. | 358/1.15 |
| 8,031,375 B2 | 10/2011 | Yoshida | |
| 8,107,129 B2 | 1/2012 | Yang et al. | |
| 2005/0018237 A1 | 1/2005 | Cossel et al. | |
| 2006/0101523 A1 | 5/2006 | Talbert | |
| 2008/0297825 A1 | 12/2008 | Hikichi | |
| 2008/0297853 A1 | 12/2008 | Yang et al. | |
| 2009/0066977 A1 | 3/2009 | Yoshida | |
| 2010/0060923 A1 | 3/2010 | Kakutani | |

FOREIGN PATENT DOCUMENTS

| | | |
|---|---|---|
| JP | H04-009963 | 1/1992 |
| WO | 2009/130980 A1 | 10/2009 |

OTHER PUBLICATIONS

Official Communication dated Jan. 16, 2012, issued by the European Patent Office, in European Patent Application No. 11170100.9.

* cited by examiner

*Primary Examiner* — Dov Popovici
(74) *Attorney, Agent, or Firm* — Fitzpatrick, Cella, Harper & Scinto

(57) ABSTRACT

In a copying machine that installs the function of preventing unauthorized copying, when copy prohibition information is extracted, whether output is permitted or prohibited in each of different types of output processing is set, and, when the copy prohibition information is extracted from a document image, if a setting for permitting the output in the output processing in which an output start is instructed is made, the output is performed.

14 Claims, 31 Drawing Sheets

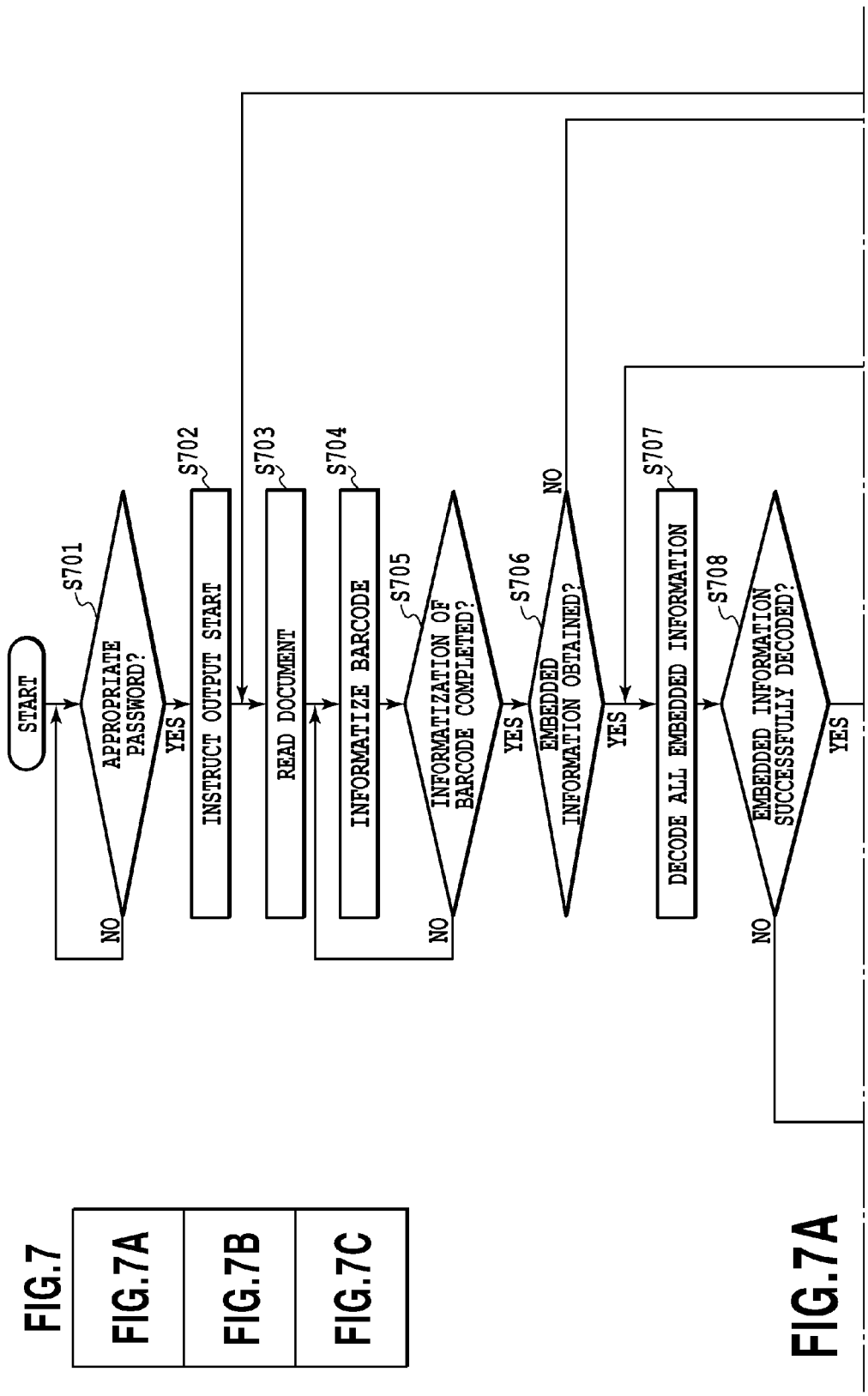

| OPERATION SETTING AT TIME OF EXTRACTION OF COPY CONTROL INFORMATION | | | 801 |
|---|---|---|---|
| | OPERATION AT TIME OF EXTRACTION OF COPY PROHIBITION INFORMATION | | |
| COPYING | ● OUTPUT PERMISSION | ○ OUTPUT PROHIBITION | 802 |
| STORING IN STORAGE | ● OUTPUT PERMISSION | ○ OUTPUT PROHIBITION | 803 |
| E-MAIL TRANSMISSION | ○ OUTPUT PERMISSION | ● OUTPUT PROHIBITION | 804 |
| FACSIMILE TRANSMISSION | ○ OUTPUT PERMISSION | ● OUTPUT PROHIBITION | 805 |

FIG.8A

| OPERATION SETTING AT TIME OF EXTRACTION OF COPY CONTROL INFORMATION | | |
|---|---|---|
| | OPERATION AT TIME OF EXTRACTION OF COPY PROHIBITION INFORMATION | OPERATION AT TIME OF EXTRACTION OF CONDITIONAL COPY PERMISSION INFORMATION |
| COPYING | ● OUTPUT PERMISSION  ○ OUTPUT PROHIBITION } 802 | ● OUTPUT PERMISSION WITHOUT CONDITION DETERMINATION PROCESSING  ○ WITH CONDITION DETERMINATION PROCESSING } 811 |
| STORING IN STORAGE | ● OUTPUT PERMISSION  ○ OUTPUT PROHIBITION } 803 | ● OUTPUT PERMISSION WITHOUT CONDITION DETERMINATION PROCESSING  ○ WITH CONDITION DETERMINATION PROCESSING } 812 |
| E-MAIL TRANSMISSION | ○ OUTPUT PERMISSION  ● OUTPUT PROHIBITION } 804 | ○ OUTPUT PERMISSION WITHOUT CONDITION DETERMINATION PROCESSING  ● WITH CONDITION DETERMINATION PROCESSING } 813 |
| FACSIMILE TRANSMISSION | ○ OUTPUT PERMISSION  ● OUTPUT PROHIBITION } 805 | ○ OUTPUT PERMISSION WITHOUT CONDITION DETERMINATION PROCESSING  ● WITH CONDITION DETERMINATION PROCESSING } 814 |

| OPERATION SETTING AT TIME OF EXTRACTION OF COPY CONTROL INFORMATION | | |
|---|---|---|
| COPYING | COPY PROHIBITION INFORMATION: OUTPUT PERMISSION<br>● CONDITIONAL COPY PERMISSION INFORMATION: WITHOUT CONDITION DETERMINATION PROCESSING | COPY PROHIBITION INFORMATION: OUTPUT PROHIBITION<br>○ CONDITIONAL COPY PERMISSION INFORMATION: WITH CONDITION DETERMINATION PROCESSING |
| STORING IN STORAGE | COPY PROHIBITION INFORMATION: OUTPUT PERMISSION<br>● CONDITIONAL COPY PERMISSION INFORMATION: WITHOUT CONDITION DETERMINATION PROCESSING | COPY PROHIBITION INFORMATION: OUTPUT PROHIBITION<br>○ CONDITIONAL COPY PERMISSION INFORMATION: WITH CONDITION DETERMINATION PROCESSING |
| E-MAIL TRANSMISSION | COPY PROHIBITION INFORMATION: OUTPUT PERMISSION<br>● CONDITIONAL COPY PERMISSION INFORMATION: WITHOUT CONDITION DETERMINATION PROCESSING | COPY PROHIBITION INFORMATION: OUTPUT PROHIBITION<br>○ CONDITIONAL COPY PERMISSION INFORMATION: WITH CONDITION DETERMINATION PROCESSING  DETAIL SETTING |
| FACSIMILE TRANSMISSION | COPY PROHIBITION INFORMATION: OUTPUT PERMISSION<br>● CONDITIONAL COPY PERMISSION INFORMATION: WITHOUT CONDITION DETERMINATION PROCESSING | COPY PROHIBITION INFORMATION: OUTPUT PROHIBITION<br>○ CONDITIONAL COPY PERMISSION INFORMATION: WITH CONDITION DETERMINATION PROCESSING  DETAIL SETTING |

FIG.8C

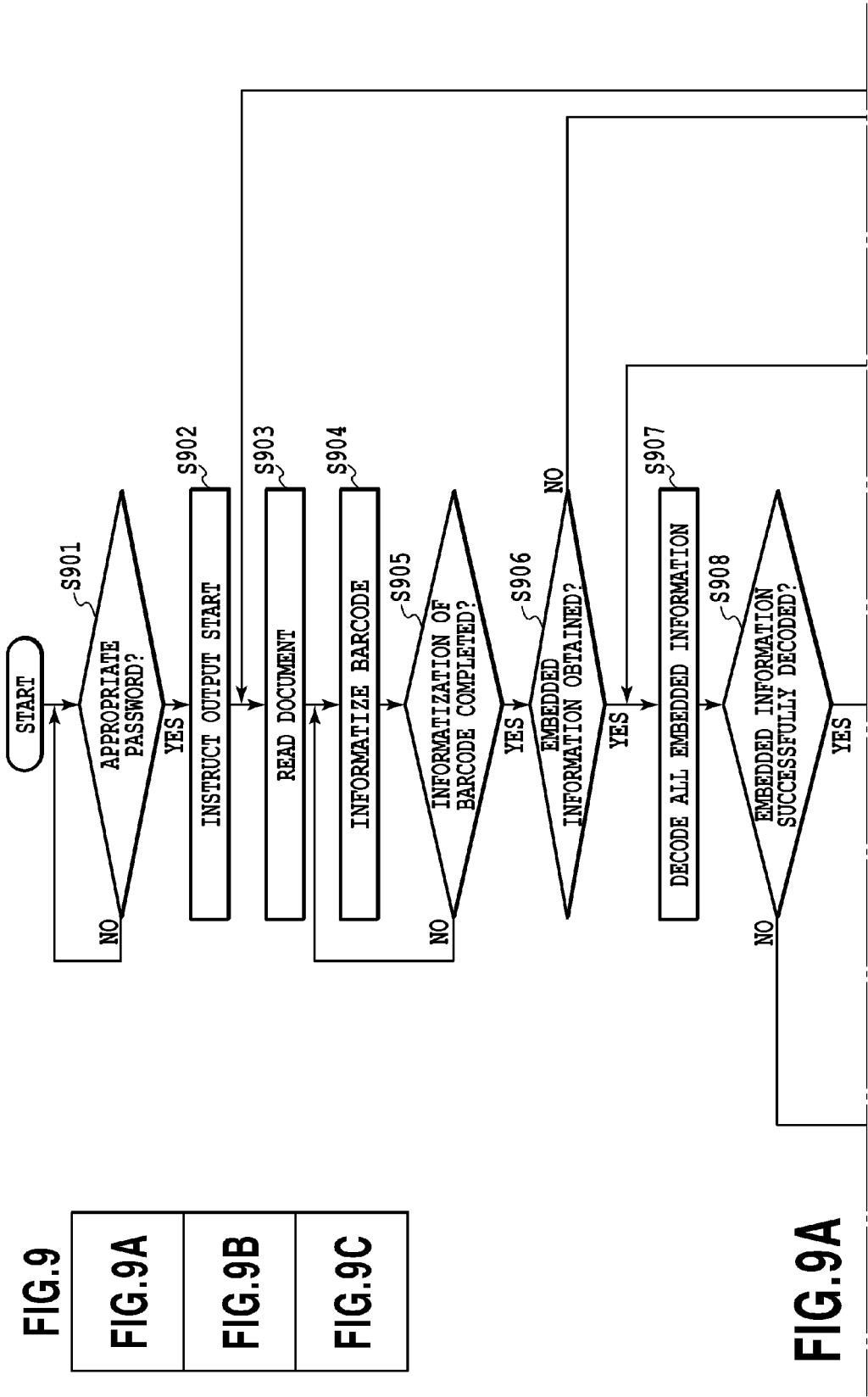

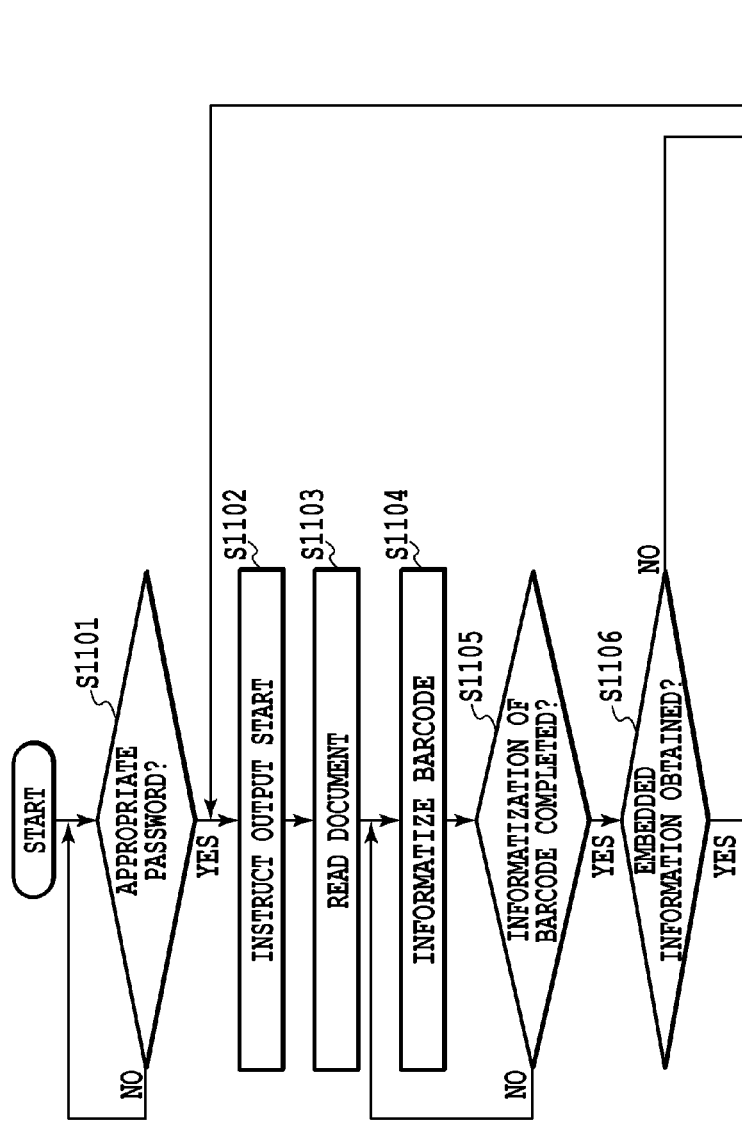

| EXTRACTION EXECUTION SETTING OF COPY CONTROL INFORMATION | | |
|---|---|---|
| COPYING | ○ ON | ● OFF |
| STORING IN STORAGE | ● ON | ○ OFF |
| E-MAIL TRANSMISSION | ● ON | ○ OFF |
| FACSIMILE TRANSMISSION | ● ON | ○ OFF |

FIG.12

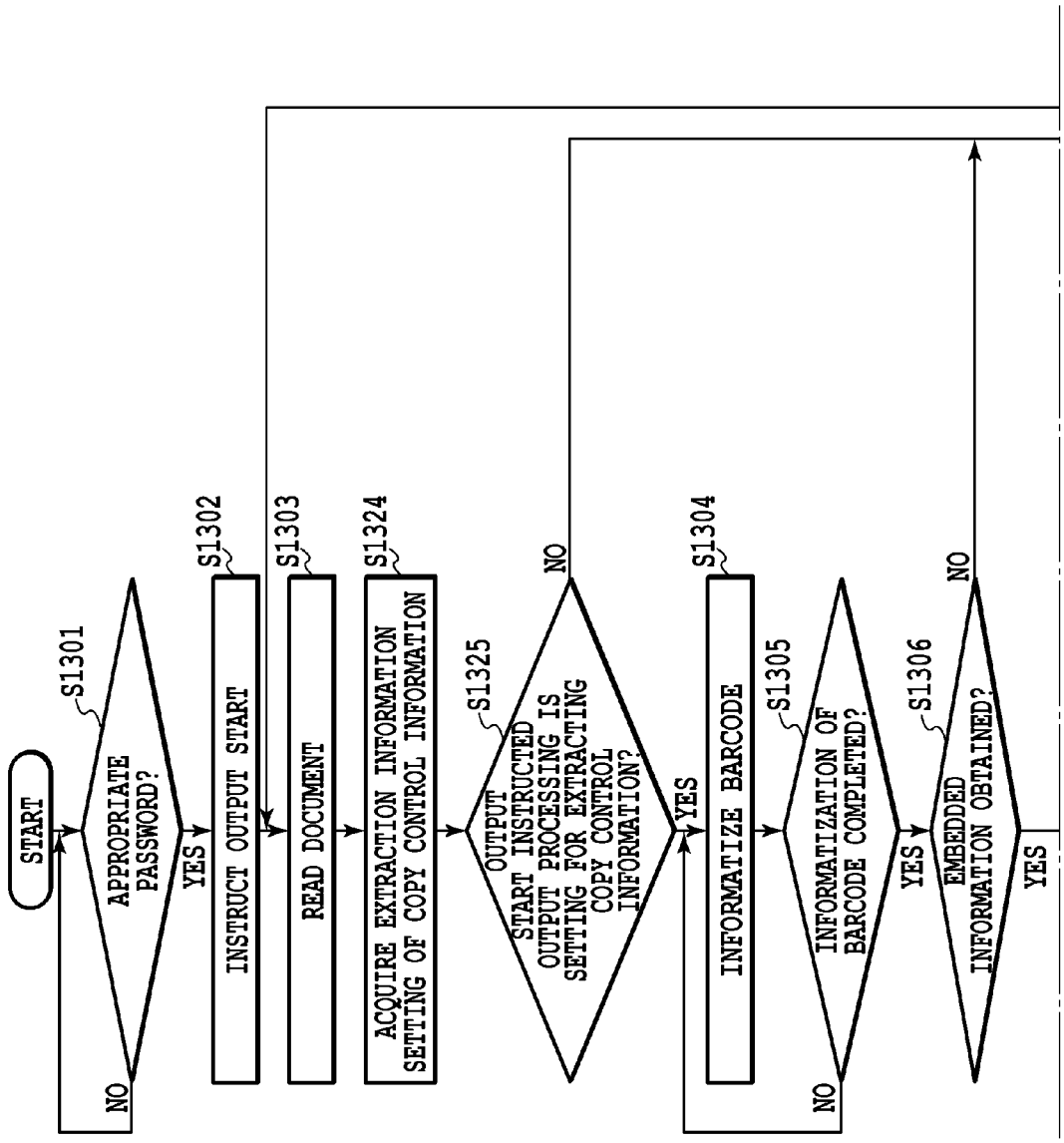

| SECURE MODE SETTING ○ ON ● OFF | | |
|---|---|---|
| COPYING | ● OUTPUT PERMISSION | ○ OUTPUT PROHIBITION |
| STORING IN STORAGE | ● OUTPUT PERMISSION | ○ OUTPUT PROHIBITION |
| E-MAIL TRANSMISSION | ○ OUTPUT PERMISSION | ● OUTPUT PROHIBITION |
| FACSIMILE TRANSMISSION | ○ OUTPUT PERMISSION | ● OUTPUT PROHIBITION |

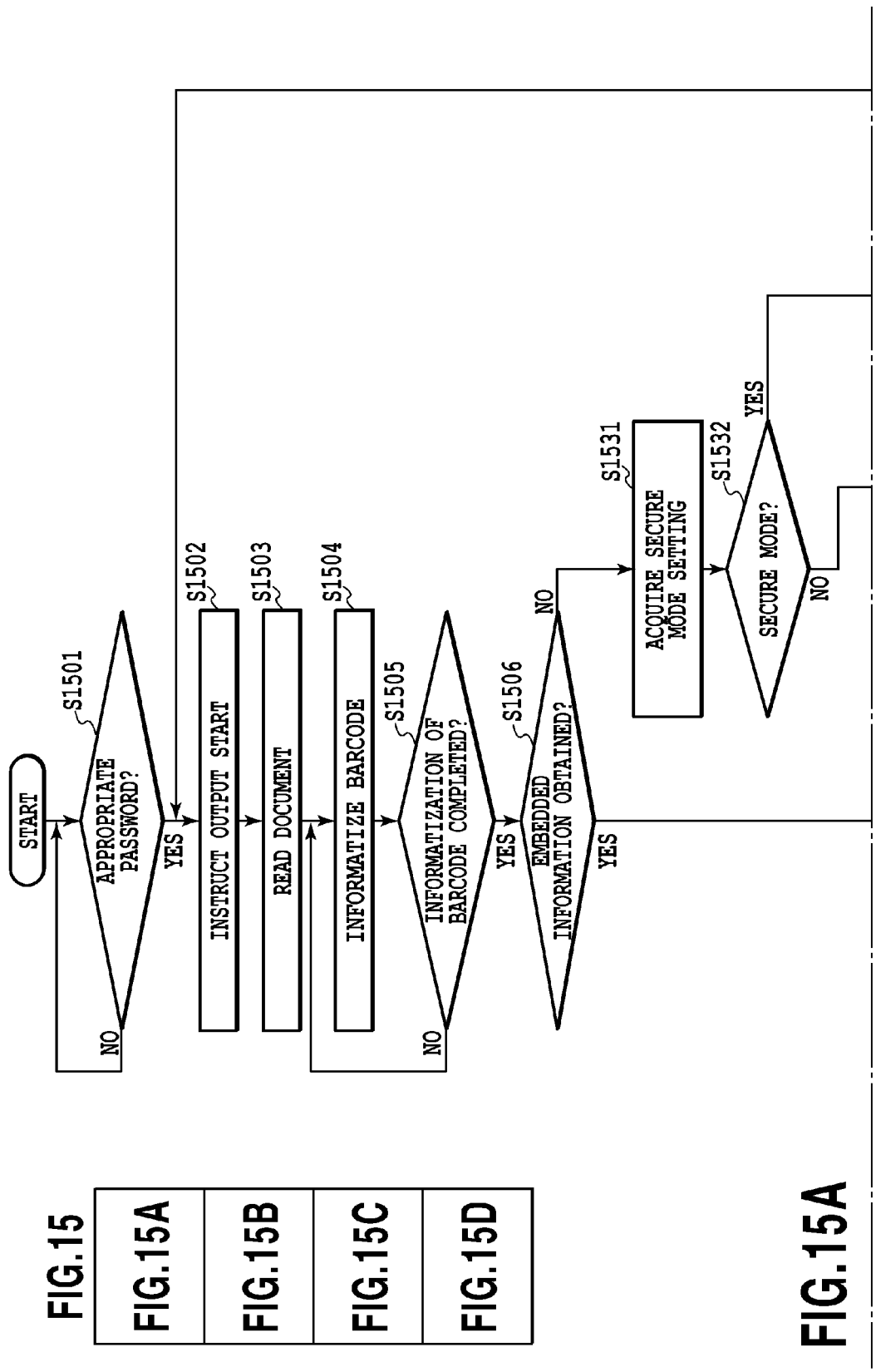

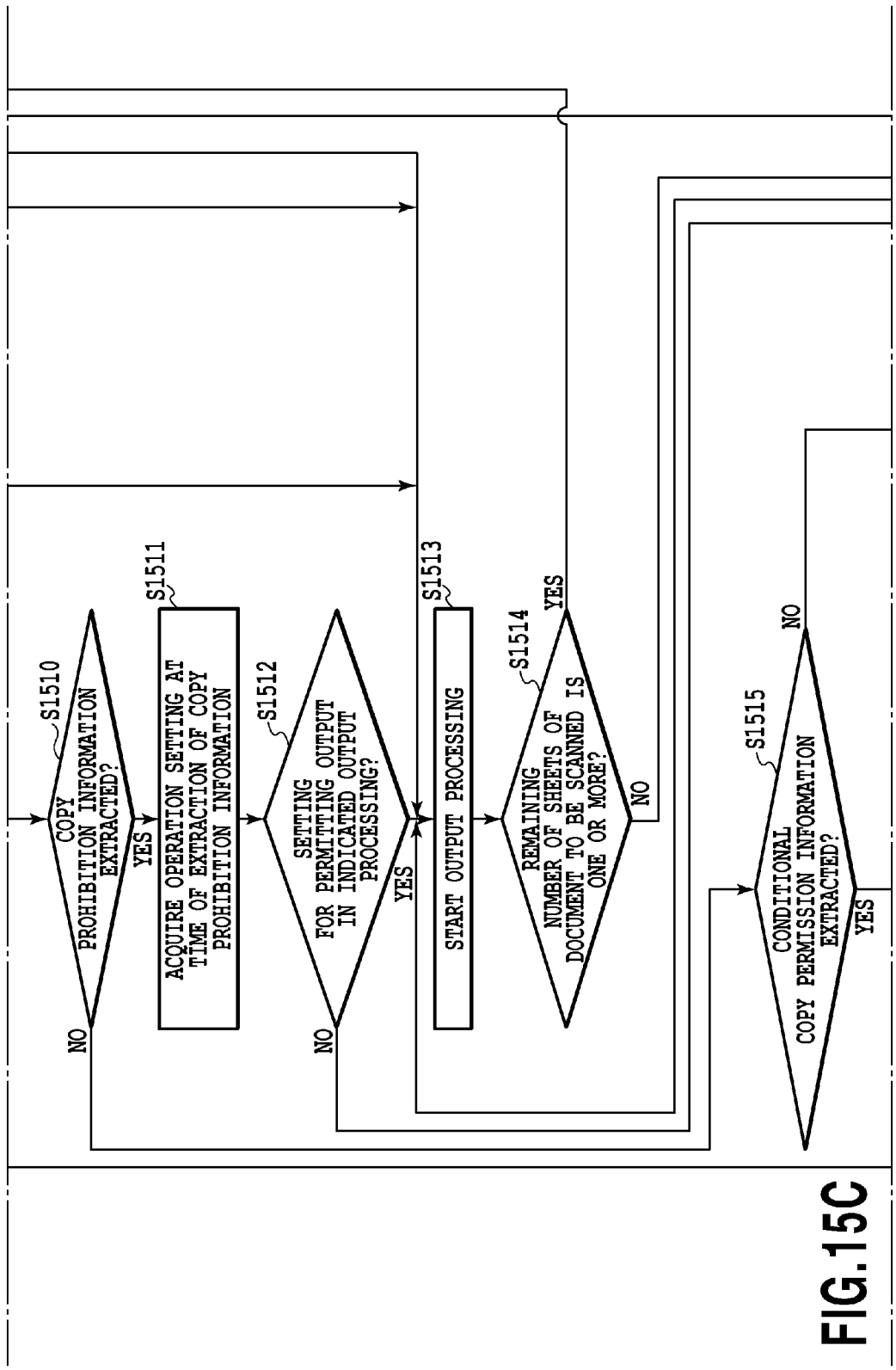

FIG.16A

| SECURITY POLICY | |
|---|---|
| SECURITY LEVEL 1 | ○ |
| SECURITY LEVEL 2 | ● ⎫ |
| SECURITY LEVEL 3 | ○ ⎬ 1602 |
| SECURITY LEVEL 4 | ○ ⎭ |

| | EXTRACTED INFORMATION | COPYING | STORING IN STORAGE | E-MAIL TRANSMISSION | FACSIMILE TRANSMISSION |
|---|---|---|---|---|---|
| SETTING VALUE | SECURITY LEVEL 1 | COPY PROHIBITION INFORMATION PROHIBIT OUTPUT | COPY PROHIBITION INFORMATION PROHIBIT OUTPUT | COPY PROHIBITION INFORMATION PROHIBIT OUTPUT | COPY PROHIBITION INFORMATION PROHIBIT OUTPUT |
| | SECURITY LEVEL 2 | COPY PROHIBITION INFORMATION PERMIT OUTPUT | COPY PROHIBITION INFORMATION PROHIBIT OUTPUT | COPY PROHIBITION INFORMATION PROHIBIT OUTPUT | COPY PROHIBITION INFORMATION PROHIBIT OUTPUT |
| | SECURITY LEVEL 3 | COPY PROHIBITION INFORMATION PERMIT OUTPUT | COPY PROHIBITION INFORMATION PERMIT OUTPUT | COPY PROHIBITION INFORMATION PROHIBIT OUTPUT | COPY PROHIBITION INFORMATION PROHIBIT OUTPUT |
| | SECURITY LEVEL 4 | COPY PROHIBITION INFORMATION PERMIT OUTPUT | COPY PROHIBITION INFORMATION PERMIT OUTPUT | COPY PROHIBITION INFORMATION PERMIT OUTPUT | COPY PROHIBITION INFORMATION PERMIT OUTPUT |

DEVICE CAPABLE OF EXTRACTING COPY PROHIBITION INFORMATION AND CONTROL METHOD THEREOF

BACKGROUND OF THE INVENTION

1. Field of the Invention

The present invention relates to a device that can extract copy prohibition information and a control method thereof.

2. Description of the Related Art

In recent years, as copying machines have been widely used, unauthorized document copying has increased. As a technology for solving this problem, there is a technology for preventing a specific document from being copied. Regarding the technology for preventing the copying, there is disclosed a method where, when a copying machine reads a document to which copy prohibition information is added, the copying machine prohibits the document from being copied (for example, Japanese Patent Laid-Open No. H04-009963 (1992)).

Some copying machines have not only the output function of copying but also various output functions such as storing document data in a storage, the transmission of an e-mail and the transmission of a facsimile.

When the copying machine having a plurality of functions described above is used, documents are permitted to be copied in-house. On the other hand, since information may leak to the outside at the time of transmission of an e-mail or a facsimile, it is necessary to consider operation which prohibits such output through these output functions.

However, in the conventional technology described above, when the document to which copy prohibition information is added is read, whatever output function is specified, the output thereof is prohibited without exception. Hence, when the document to which copy prohibition information is added is read, it is impossible to switch, for each of the functions, whether or not to produce an output through the output function specified by the user.

SUMMARY OF THE INVENTION

The present invention is made in view of the foregoing problem, an object of the present invention is to enable switching whether to permit or prohibit output for each of output functions when a document to which copy prohibition information is added is read.

There is provided a device that can perform a plurality of types of output processing on a document image obtained by reading a document, the device including: a holding unit configured to hold operation setting information indicating whether or not output is permitted in each of the plurality of types of output processing; a reception unit configured to receive, from a user, a specification of which type of output processing is performed; a determination unit configured to determine whether or not the document image includes copy control information; and a control unit configured to control output such that, when the copy control information includes copy prohibition information, if the output by the type of output processing specified by the user is permitted in the operation setting information, the document image is output based on the type of output processing specified by the user whereas, if the type of output processing specified by the user is not permitted in the operation setting information, the document image is not output.

According to the present invention, when the document to which the copy prohibition information is added is read, since output can be controlled in each output function based on a setting for determining whether to permit or prohibit the output, it is possible to perform flexible operation of copy prohibition function.

Further features of the present invention will become apparent from the following description of exemplary embodiments (with reference to the attached drawings).

BRIEF DESCRIPTION OF THE DRAWINGS

FIG. 7 is a diagram showing the relationship of FIGS. 7A to 7C;

FIGS. 7A to 7C are flowcharts showing an output operation in a first embodiment;

FIGS. 8A to 8C are diagrams showing an example of a screen for setting an operation at the time of extraction of the copy control information;

FIG. 9 is a diagram showing the relationship of FIGS. 9A to 9C;

FIGS. 9A to 9C are flowcharts showing an output operation in a second embodiment;

FIG. 11 is a diagram showing the relationship of FIGS. 11A to 11D;

FIGS. 11A to 11D are flowcharts showing an output operation in a third embodiment;

FIG. 12 is a diagram showing an example of a screen for setting whether or not to perform execution at the time of extraction of the copy control information;

FIG. 13 is a diagram showing the relationship of FIGS. 13A to 13D;

FIGS. 13A to 13D are flowcharts showing an output operation in a fourth embodiment;

FIG. 14 is a diagram showing an example of a screen for setting a secure mode;

FIG. 15 is a diagram showing the relationship of FIGS. 15A to 15D;

FIGS. 15A to 15D are flowcharts showing an output operation in a fifth embodiment; and FIGS. 16A and 16B are diagrams showing an example of a screen for setting, at a time, operations at the time of extraction of the copy control information.

DESCRIPTION OF THE EMBODIMENTS

Figure 1:
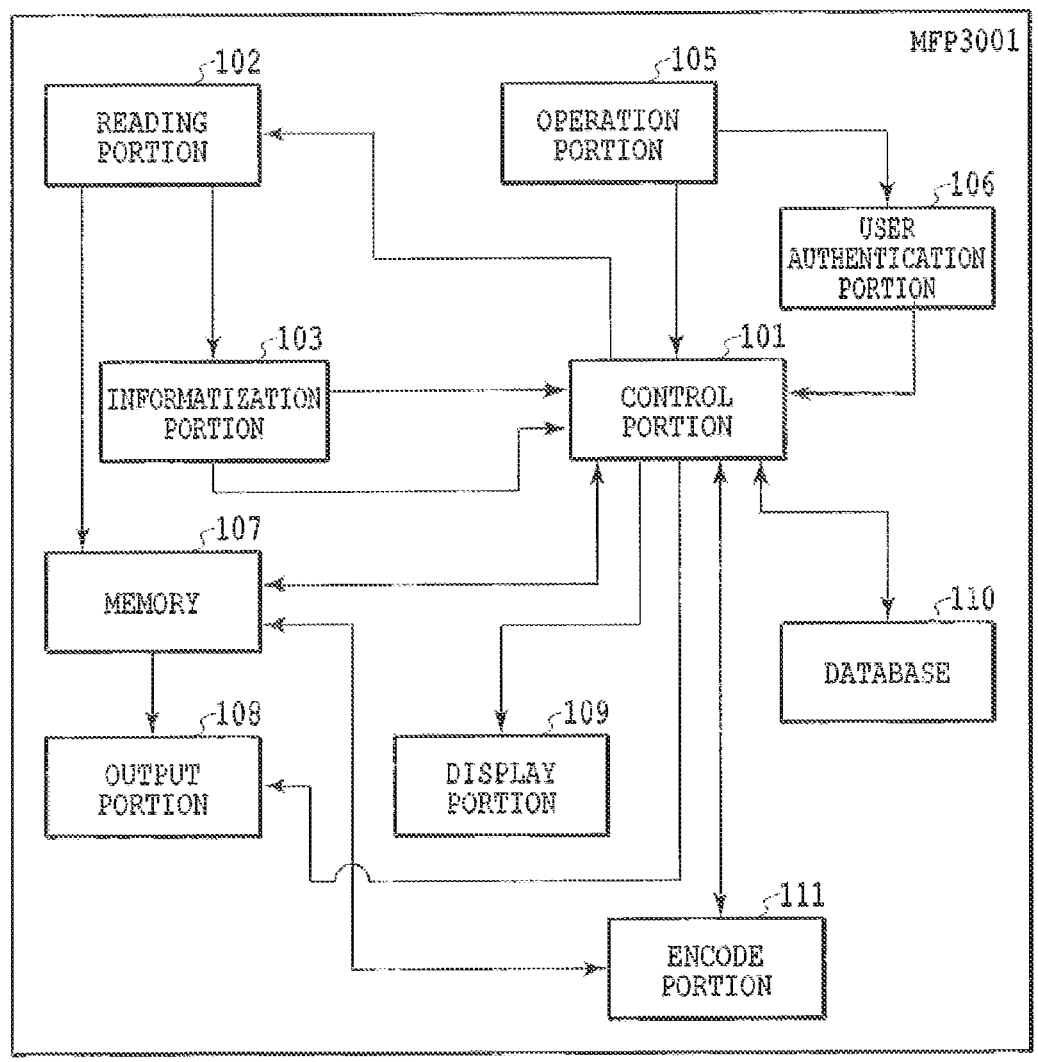
FIG. 1 is a functional block diagram of an MFP3001 in each of embodiments.

Preferred embodiments of the present invention will be described in detail below with reference to the accompanying drawings.

First Embodiment

In the first embodiment of the present invention, when a copying machine reads a document to which copy prohibition information is added, a determination is made, based on the setting of permission and prohibition for each output processing specified by a user, as to whether or not to produce an output.

Terms used in the present embodiment will first be described. Copy control information is assumed to be added to a document by copying. Regarding the copy control information, there is copy prohibition information, copy permission information or conditional copy permission information. The conditional copy permission information includes authentication information such as a password and a user ID.
(Processing for Producing a Document to which Copy Control Information is Added)

Processing for producing the document to which the copy control information is added will now be described.

Firstly, the copy control information is encoded to generate embedded information. Next, the embedded information is imaged to produce a barcode. Then, the produced barcode is copied. A plurality of barcodes resulting from the copying is combined to produce a barcode group. Then, the barcode group and a document image are combined to produce the document image combined with the barcodes. Then, the document image combined with the barcodes is printed. In this way, copies of the document image to which the copy control information is added as the barcodes are produced. This processing is referred to as the "addition" of the copy control information. The processing for encoding and imaging the copy control information (thereby producing barcodes) is referred to as barcoding of the copy control information.

The purpose of combining the barcode group composed of a plurality of barcodes with a document image and printing it is to obtain the effect of enhancing durability. The barcode group is combined with the document image and is printed as described above, and thus it is possible to extract the copy control information from the document as long as at least one barcode without being stained is present in the document.

In embodiments below including the present embodiment, processing in each step will be described using, an example, a method in which the barcode group is utilized as described above. That is, the method in which the barcode group is utilized means a method in which the barcode group is combined with the document image and is printed and a method in which a document resulting from the printing is read and output is controlled. Furthermore, a method in which only one barcode is combined with the document image and is printed or a method in which a document resulting from the printing is read and output is controlled may be used.

In the present embodiment, the number of barcodes included in the barcode group corresponds to the size of a document image. For example, when a document image has such a size that the document image is printed in an A4 sized (21 cm×29.7 cm) sheet, 21×29 barcodes are included in the barcode group. Thus, the barcodes are included in the entire surface of the document image as produced above.
(Processing for Extracting Copy Control Information)

Processing for extracting copy control information from a document image to which the copy control information is added as barcodes will now be described. Firstly, a document placed on a platen or an ADF (auto document feeder) is read, and a document image is produced. Then, barcodes are found out from the document image. Then, the found-out barcodes are informatized, and embedded information is obtained. Then, the embedded information is decoded, and copy control information is obtained. Thus, it is possible to obtain the copy control information from the document to which the copy control information is added as the barcodes. This series of processing is referred to as the "extraction" of the copy control information.

In addition, the copy control information does not include the error correction code, though the embedded information includes an error correction code.
(Configuration of a Copying Machine)

With reference to FIG. 1, the configuration of a copying machine MFP3001 according to the first embodiment of the present invention will be described in detail below. Here, FIG. 1 is a block diagram showing the configuration of the MFP3001.

A control portion 101 controls the operation of each unit of the MFP3001. The control portion 101 includes a CPU (central processing unit) or the like. The control portion 101 also decodes the embedded information.

An operation portion 105 receives an operation input to the MFP3001 from a user. The operation portion 105 also receives the user's instruction of output processing performed when the document image is output.

A user authentication portion 106 manages information necessary for authentication of the user who uses the MFP3001. The operation of the user authentication portion 106 will be described in detail later.

A reading portion 102 reads the document (for example, optical scan of the document) to produce the document image. While the document is a paper document such as a printed material, the document image is digital (or analog) data.

An informatization portion 103 finds barcodes from the document image and informatizes them.

A memory 107 includes a storage device or the like, and holds or stores various types of information. For example, the memory 107 stores the document image.

An output portion 108 reads the document image from the memory 107, and thereafter outputs the document image based on the type of output processing specified by the user. For example, the output processing refers to the printing of the document, the transmission of the document image to an external device or the like. Here, the external device refers to a PC or the like that is connected to the MFP3001 through a network.

A display portion 109 displays various images on a display screen according to control of the control portion 101.

A database 110 records or holds the printing setting and logs used of the MFP3001.

An encode portion 111 encodes the copy control information.
(Details of an Operation for Adding the Copy Control Information to the Document)

A procedure operated by the user when the copy control information is added and the corresponding processing performed by the MFP3001 will now be described in detail.

Firstly, the user who desires to add the copy control information to the document image enters, while looking at a setting screen displayed on the display portion 109, authentication information such as a user ID and a password allocated to the user himself/herself, through the operation portion 105.

The authentication information entered through the operation portion 105 is sent from the operation portion 105 to the user authentication portion 106. Then, the user authentication portion 106 determines, according to the managed information, whether or not the entered password is an appropriate password, and verifies the authentication.

When the entered password is determined to be the appropriate password, the user authentication portion 106 transmits, to the control portion 101, information indicating that the entered password is the appropriate password and the user ID.

The control portion 101, having received the information indicating that the input password is the appropriate password and the user ID, displays, on the display portion 109, a checkbox (not shown) for making an inquiry to the user as to whether or not to add the copy control information to the document. When the user selects adding the copy control information to the document through the checkbox, the control portion 101 displays a print security setting dialog box 601 shown in FIG. 6, on the display portion 109.

The user checks a radio button 602 within the print security setting dialog box 601, and thereby can select one of "prohibit copying", "permit copying" and "set conditions for permitting copying". If "prohibit copying" is selected, the copy prohibition information is added as the copy control information to the document image to be printed. If "permit copying" is selected, the copy permission information is added as the copy control information to the document image to be printed.

If "set conditions for permitting copying" is selected, input to a condition input field 603 can be enabled, and the user can enter the authentication information (for example, the password and the user ID) to it. If the password is the authentication information, for example, the user enters own password. On the other hand, if the condition is the user ID, the user does not need to enter own password, and can enter information indicating that the authentication information is the user ID. This is because the user ID is used in the user authentication and is already entered.

An OK button 604 is a button that receives an instruction to perform processing related to the selected radio button 602; a cancel button 605 is a button that receives an instruction to close the print security setting dialog box 601.

The same copy control information is added to all document images produced by a series of copying. Here, the series of copying refers to the production of the document images through one-time instruction to perform copying on a document group composed of a plurality of documents placed on the platen or the ADF.

Hence, for example, when the user provides, to the MFP3001, an instruction to perform copying on a document group (for example, four sheets) placed on the ADF to make three copies, the same copy control information is added to all three copied materials (that is, 12 sheets) including the produced document images.

The instruction to add the copy control information may be provided through a driver or utility of a PC connected to the MFP3001. In the first embodiment, the copy control information that is added to one sheet of a document image is any one of the copy prohibition information, the copy permission information and the conditional copy permission information.

(The Method of Producing the Document Image Including the Barcodes)

Figure 2:
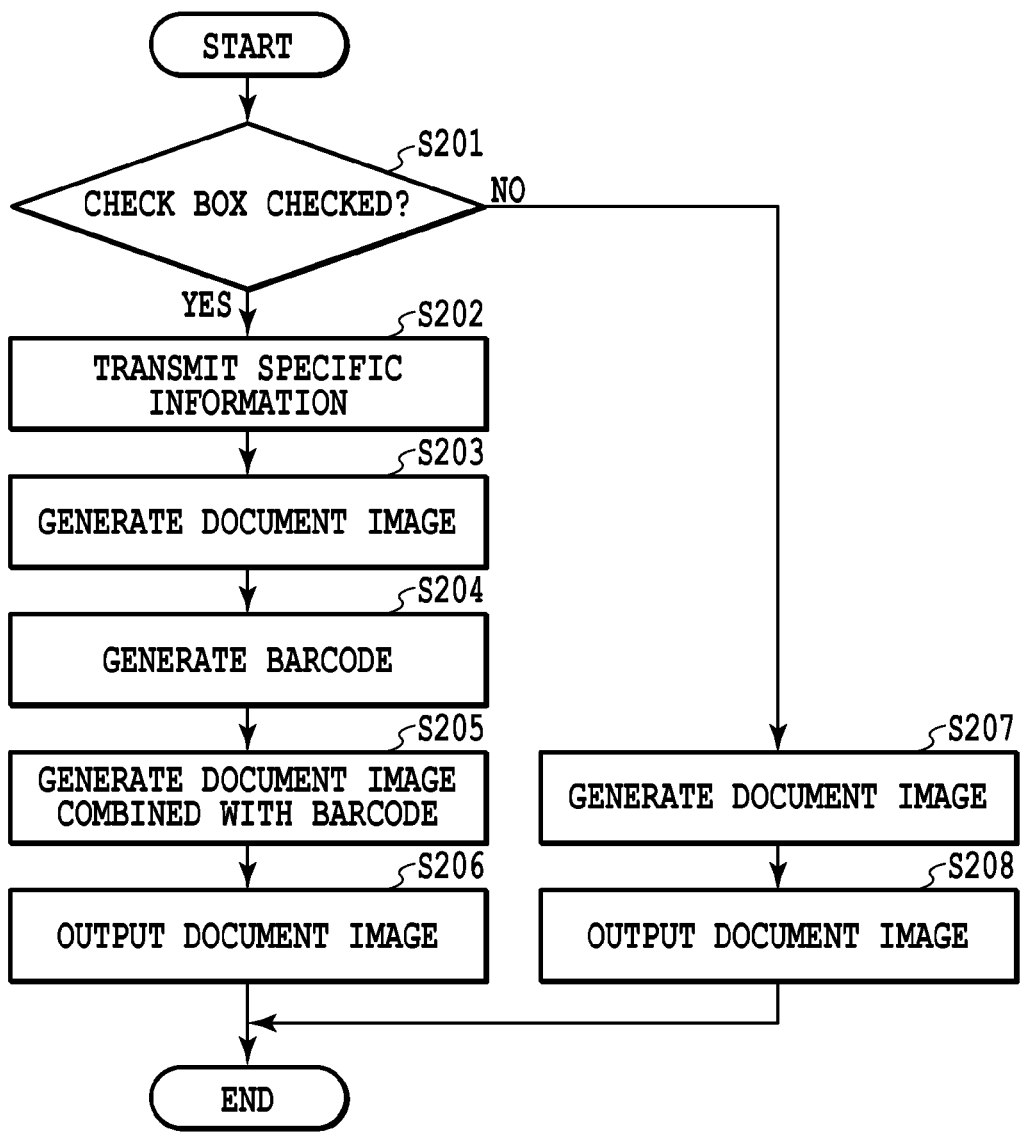
FIG. 2 is a flowchart showing processing for producing a document image by the MFP3001.

The processing procedure for producing the document image including the barcodes will now be described in detail with reference to FIG. 2.

Figure 6:
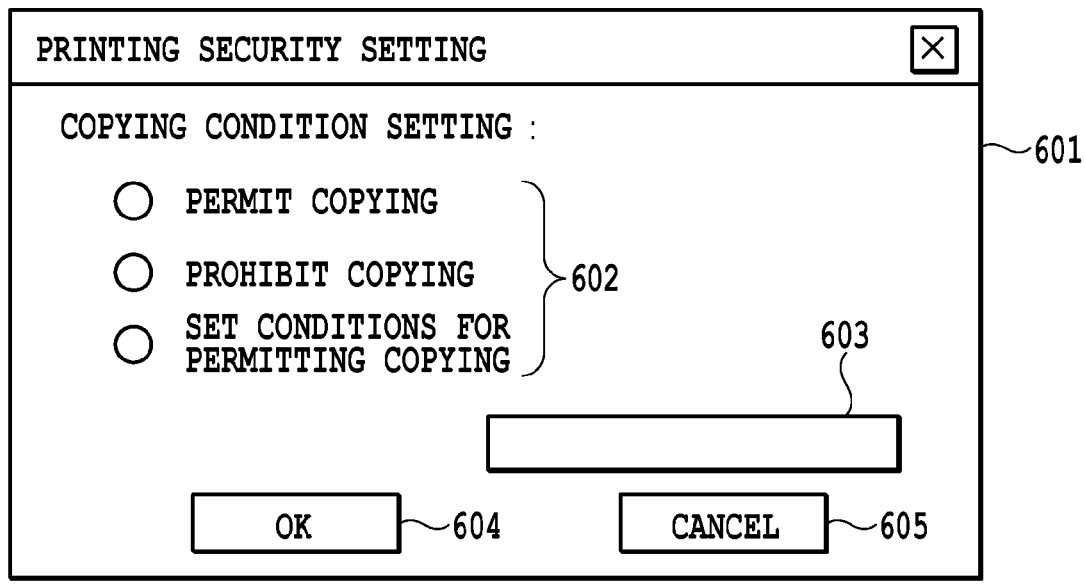
FIG. 6 is a diagram showing an example of a screen for setting copy control information.

Firstly, the control portion 101 determines whether or not any one of the radio buttons 602 shown in FIG. 6 is checked (S201).

Then, in S201, when one of the radio buttons 602 is determined to be checked, the control portion 101 receives, from the operation portion 105, information specifying the radio button 602 selected by the user. Then, the copy control information corresponding to the selection by the user is transmitted to the encode portion 111 (S202). Here, when the selection made by the user is "prohibit copying", the copy control information includes the copy prohibition information. When the selection made by the user is "set conditions for permitting copying", the copy control information includes the conditional copy permission information and conditions.

Then, the reading portion 102 reads the document to produce the document image, and transmits it to the memory 107 and the informatization portion 103 (S203).

Then, the encode portion 111 encodes and images the transmitted copy control information, and thereby produces a barcode. Furthermore, the encode portion 111 copies the barcode a number of times (for example, 609) corresponding to the size of the document image. Then, a plurality of barcodes (for example, 609 barcodes) resulting from the copying is combined together to produce a barcode group, and the barcode group is transmitted to the memory 107 (S204).

Then, the control portion 101, when detecting that the memory 107 has received the barcode group and the document image, combines the barcode group and the document image together to produce the document image combined with the barcodes (S205). As described above, in the present embodiment, a plurality of barcodes is combined together to produce the barcode group, and the produced barcode group is combined with the document image. In this way, the document image combined with the barcodes is produced. However, the method of the present invention is not limited to the procedure described above; the procedure may be changed. For example, even when the barcode is repeatedly combined with the document image one by one, the same document image can be produced.

Then, the control portion 101 reads the document image combined with the barcodes from the memory 107 and transmits it to the output portion 108, and makes the output portion 108 output the document image (S206). The function of outputting the document image by the output portion 108, for example, includes the printing of the document image and the transmission by a facsimile.

When the radio button 602 is not checked (no in S201), the reading portion 102 reads the document to produce the document image, and transmits it to the memory 107 (S207).

Then, the control portion 101, when detecting that the memory 107 has received the document image, transmits the document image from the memory 107 to the output portion 108, and makes the output portion 108 output the document image (S208).

(Structure of the Barcode)

Figure 3:
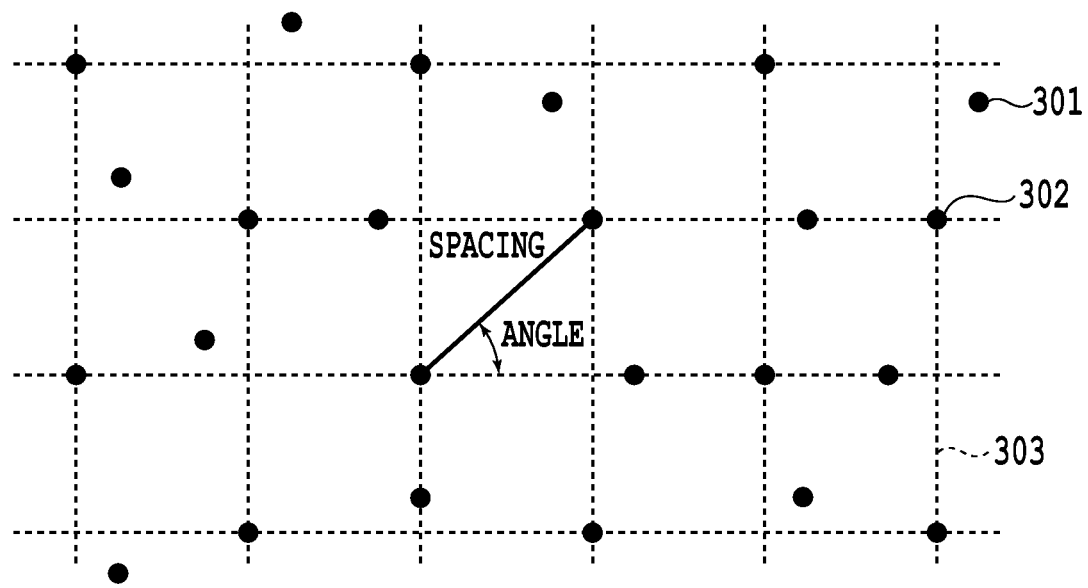
FIG. 3 is a diagram illustrating how a reference grid is drawn in part of one barcode.
Figure 5:
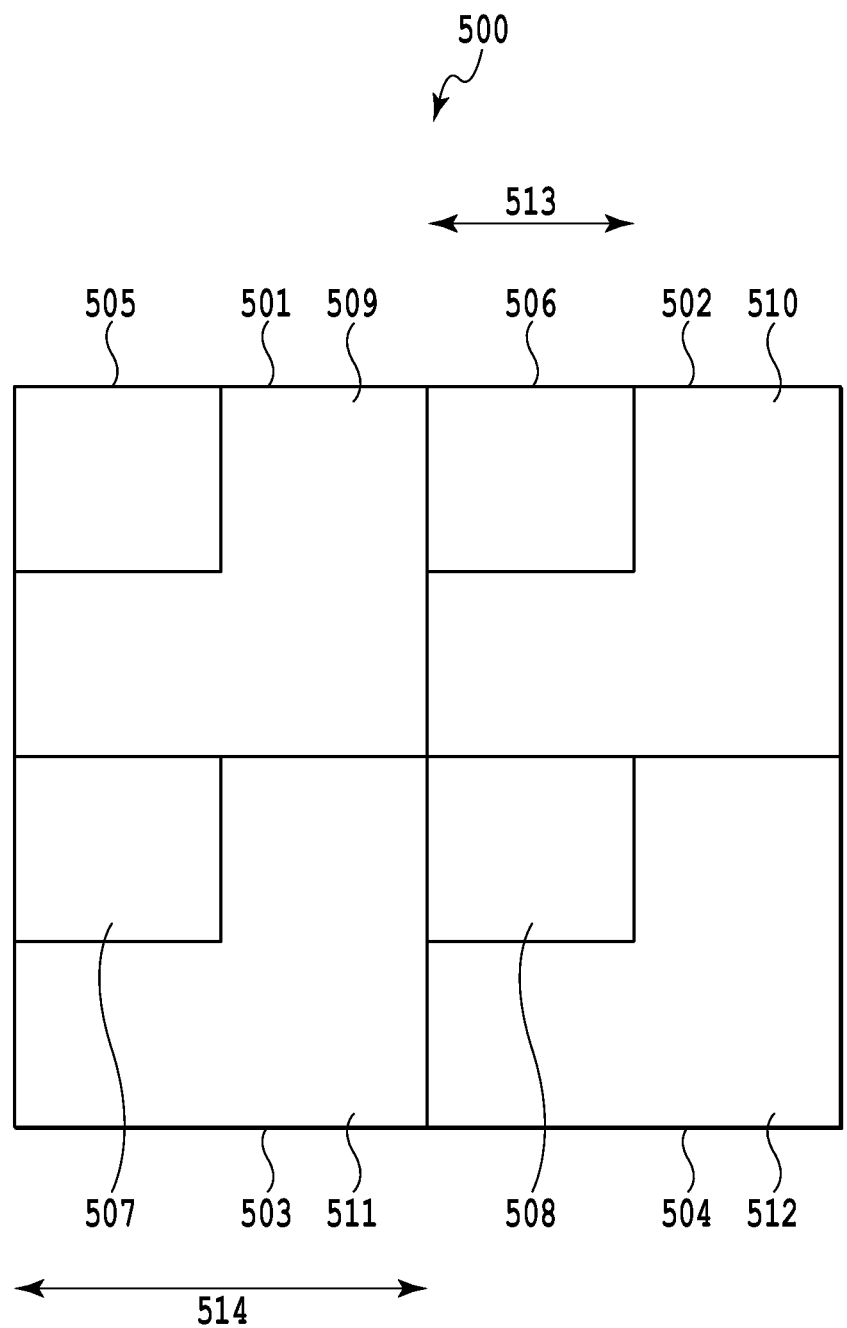
FIG. 5 is a diagram illustrating the configuration of a barcode.

The structure of the barcode will now be described in detail with reference to FIGS. 3 and 5. FIG. 5 is a diagram illustrating a plurality of regions in one barcode. FIG. 3 shows an example where a reference grip is drawn in part of one barcode.

Reference numeral 500 in FIG. 5 represents an example of a barcode having a size of about 1 cm×1 cm. This barcode 500 has two regions that are a high density region (505 to 508) and a low density region (509 to 512).

The high density region includes the encoded copy control information. The low density region includes the encoded authentication information. When the authentication information is not included, that is, when the copy prohibition information is included in the high density region (however, in a second embodiment, the copy prohibition information or the copy permission information), dummy information (meaningless information) is included in the low density region. In the high density region, a large number of error correction codes are used as compared with the low density region.

Although a large number of error correction codes are used, the high density region is smaller. That is because the data size of the copy control information is smaller than that of the authentication information. In the present embodiment, the user ID or the password is used as the authentication information. However, the authentication information is not limited to these. For example, various types of information (for example, a date and time, the user ID, the password, a section to which the user belongs and the like are combined) may be combined together to produce it. In the barcode of the present embodiment, in consideration of various combinations described above, the low density region is larger than the high density region.

FIG. 3 shows a diagram in which reference grids 303 are drawn in part of one barcode. In FIG. 3, information dots 301 and arrangement dots 302 constituting the barcode are shown. The arrangement dots 302 are present at intersections of the reference grids 303 indicated by dotted lines at a predetermined interval.

The information dots 301 are arranged at positions displaced from the intersections of the reference grids 303. The copy control information is represented by the directions in which the information dots are displaced (the directions of the positions in which the information dots are displaced with respect to the intersections). It should be noted that, although the reference grid is indicated by dotted line in FIG. 3, it is imaginary lines for illustrating the barcode, and it is actually not printed.

(Details of the Processing for Extracting the Copy Control Information from the Document Image)

The processing for extracting the copy control information from the document image will now be described. As described above, the processing for extracting the copy control information includes (1) finding out the barcode from the document image, (2) informatizing the found-out barcode to obtain the embedded information and (3) decoding the embedded information to obtain the copy control information.

Figure 4:
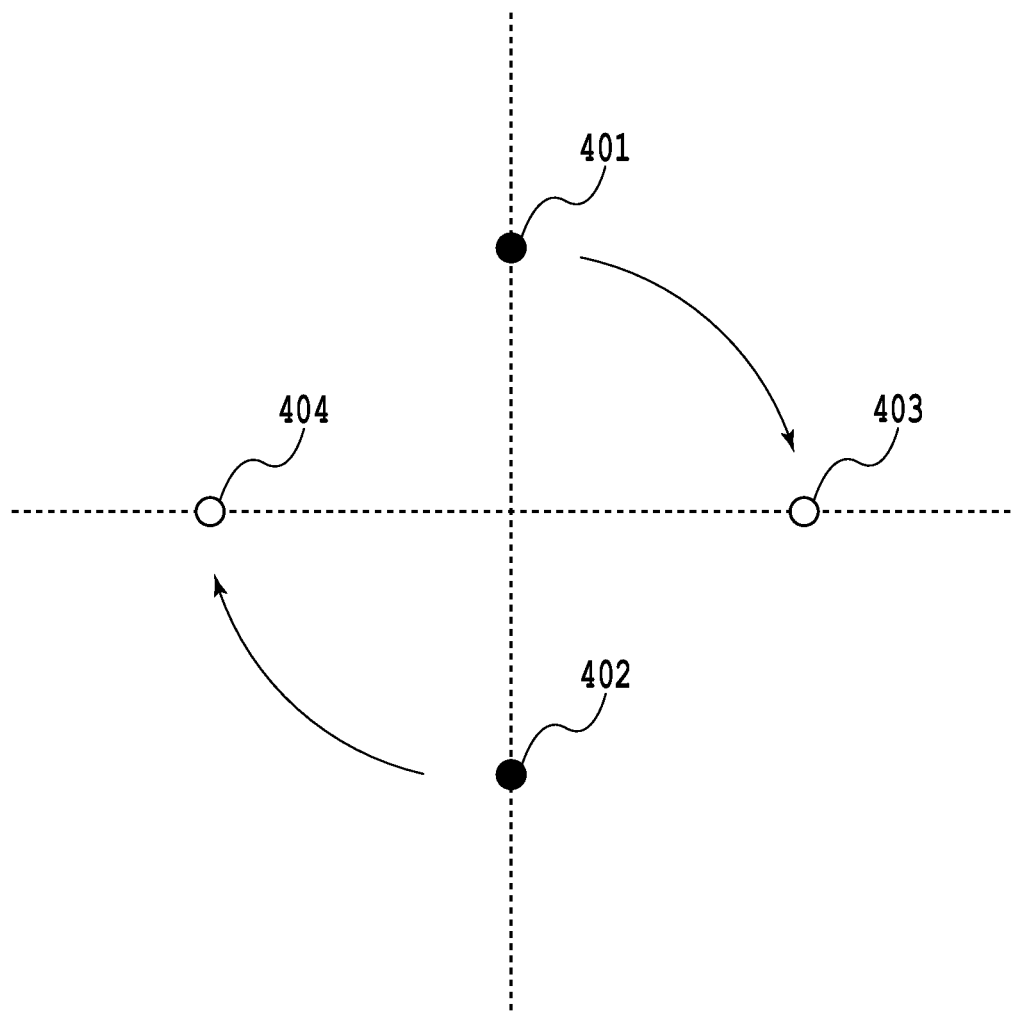
FIG. 4 is a diagram illustrating processing for finding a barcode from the document image.

(1) The processing for finding out the barcode from the document image will first be described with reference to FIG. 4. FIG. 4 shows an enlarged part of an arbitrary region of the barcode shown in FIG. 3.

Firstly, the informatization portion 103 selects an arbitrary dot 401 within the document image. Then, the informatization portion 103 further selects an arbitrary dot 402 present around the selected dot 401. Then, the informatization portion 103 turns the positions of the selected dots with respect to the center point of a line connecting the dots by 90 degrees. When other dots (in the example of FIG. 4, dots 403 and 404) are present in positions obtained by the turning, the selected dots 401 and 402 are determined, by the informatization portion 103, to be arrangement dots present at equal intervals in vertical and horizontal directions.

On the other hand, when other dots are not present in the positions obtained by the turning, the selected dots 401 and 402 are determined, by the informatization portion 103, to be information dots present at random positions.

In this way, the informatization portion 103 finds out two arrangement dots, and also finds out other arrangement dots based on constrain conditions in which arrangement dots are present at equal intervals in vertical and horizontal directions. Furthermore, the informatization portion 103 finds out a plurality of arrangement dots (for example, 100 dots each in vertical and horizontal directions), and then draws imaginary reference grids on these arrangement dots. For example, the reference grids are composed of a total of about 400 lines, that is, about 200 lines in vertical directions and about 200 lines in horizontal directions. This means that, as shown in FIG. 3, two arrangement dots in vertical directions and three arrangement dots in horizontal directions are present, and the reference grids are composed of three lines in vertical directions and six lines in horizontal directions.

It is to be noted that in the first embodiment, the processing described above (starting with the processing for selecting an arbitrary dot and ending with the processing for drawing the imaginary reference grids) is collectively referred to as processing for finding out a barcode. In the present embodiment and the subsequent embodiments, one barcode (including the high density region and the low density region) has the size of 100 horizontal lines×100 vertical lines. The interval between the two reference grids is about 100 μm. Since the informatization portion 103 horizontally and vertically draws the reference grids in a region twice as large as it, at least one barcode is present within the reference grid.

The informatization portion 103 repeatedly performs the above processing (starting with the processing for selecting an arbitrary dot and ending with the processing for drawing the imaginary reference grid) N times (for example, 20 times) while changing target regions. For example, the entire document image is divided into N regions (for example, a total of 20 regions, that is, 4 regions in vertical directions and 5 regions in horizontal directions), and the above processing is repeatedly performed N times. Since the above processing is repeatedly performed N times as described above, even if a plurality of barcode groups is present within the document image, at least one barcode included in each of the barcode groups can be found out.

For example, when two sheets of document are placed on the platen, the copy prohibition information is added to the first sheet of document and the conditional copy permission information is added to the second sheet of document, a plurality of barcode groups is present within the document image. Even in this case, since the reference grids are drawn in various regions, the informatization portion 103 can find out at least one barcode included in each of the barcode groups. That is, it is possible to find out both the barcode corresponding to the copy prohibition information and the barcode corresponding to the conditional copy permission information.

The processing for finding out the barcode has been described above.

(2) The processing for informatizing the found-out barcode to obtain the embedded information will now be described.

Firstly, the informatization portion 103 determines the directions in which the information dots are displaced from the intersections of the reference grids. Since in the above example, the reference grids with 200 lines in vertical directions and 200 lines in horizontal directions are drawn, a total of 40,000 intersections are present. Since the arrangement dots are present in 20,000 intersections of these 40,000 intersections, the directions in which the information dots are displaced are determined from the remaining 20,000 intersections. Thus, information of three bits per information dot is obtained.

More specifically, as the informatization portion 103 obtains 0 when the information dot is displaced in an upward direction, obtains 1 when the information dot is displaced in an upper right direction and obtains 2 when the information dot is displaced in a rightward direction (thereafter, each time the direction is displaced 45 degrees, the value of information is increased by one), the informatization portion 103 obtains information of 0 to 7 (three-bit information). As a result of this, information of 60,000 bits=3 bits×20,000 is obtained. The embedded information is included in this 60,000 bit information.

The processing for finding out the embedded information from the obtained information (for example, 60,000 bit information) will now be described.

Although the following description is omitted in the description of the encoding, when the encoding is performed, the encode portion 111 obtains the embedded information such that a predetermined bit sequence (for example, a bit sequence composed of 20 bits of 01010101010101010101) is first included.

The informatization portion 103 finds out the predetermined bit sequence from the obtained information (for example, 60,000 bit information). Then, the information until the predetermined bit sequence is next found out is determined to be the embedded information.

That is, the informatization portion 103 determines that "the predetermined bit sequence plus the information sequence between the predetermined bit sequences" is the embedded information. In this way, the informatization portion 103 obtains the embedded information that is "the predetermined bit sequence plus the information sequence between the predetermined bit sequences".

The informatization portion 103 performs the processing described above on all of the plurality of drawn reference grids (that is, 20 regions).

(2) The processing for informatizing the barcode to obtain the embedded information has been described above.

(3) The processing for decoding the embedded information to obtain the copy control information will finally be described.

The control portion 101 that has found out one barcode decodes the embedded information included in the high density region of the barcode. Specifically, the error correction code and the predetermined bit sequence are omitted from the embedded information. The decoding is performed as described above, and thus the control portion 101 can obtain the copy control information.

Furthermore, when the control portion 101 obtains the conditional copy permission information as the copy control information, the control portion 101 decodes the embedded information included in the low density region so as to obtain the authentication information included in the conditional copy permission information. The reason why the low density region is not always decoded but decoded only when the conditional copy permission information is obtained is that the data size of the embedded information in the low density region is larger than that in the high density region, and the decoding is time-consuming.

(3) The processing for decoding the embedded information to obtain the copy control information has been described above.

(Operation for Setting Whether or not Output is Permitted for Each Output Processing)

Processing for previously setting whether to permit or prohibit output processing specified by the user when the MFP3001 capable of preventing unauthorized copying extracts the copy prohibition information will now be described.

FIG. 8A shows an interface for setting whether or not output can be performed for each output processing when the copy control information is extracted, and it is displayed on the display portion 109.

The user checks, through the operation portion 105, each of radio buttons 802, 803, 804 and 805 within an operation setting dialog box 801 at the time of extraction of the copy control information, and thereby can set the operation in each output processing at the time of extraction of the copy control information. A configuration can be designed such that the setting through the operation setting dialog box 801 at the time of extraction of the copy control information can be made and changed by only the user who has the authority to manage the copying machine, and that general users and guest users cannot change setting values. This setting has default values, and, when the manager does not change the setting, such setting values may be used.

In the example shown in FIG. 8A, when the MFP3001 extracts the copy prohibition information, the setting is made such that output processing on copying and storing in the storage is permitted and output processing on e-mail transmission and facsimile transmission is prohibited. The values of the operation setting at the time of extraction of the copy prohibition information that are set by checking the radio buttons 802 to 805 through the operation portion 105 are stored in the database 110 by the control portion 101.

It is troublesome for the user to perform setting by checking for each output processing within the operation setting dialog box 801 at the time of extraction of the copy control information. It is assumed that the document output by the copying machine for use in the present embodiment may be used in the office but, in order for the document to be prevented from being transmitted to the outside, the output for copying and storing in the storage is permitted and output for the e-mail transmission or the facsimile transmission is prohibited. However, an erroneous setting may be made such that, for example, copying is prohibited and the output of an e-mail is permitted within the operation setting dialog box 801 at the time of extraction of the copy control information. In order to cope with this problem, it is also possible to make a setting for each output processing at a time by setting a security policy.

For example, FIG. 16A shows a screen for making operation settings at the time of extraction of the copy prohibition information at a time; it is displayed on the display portion 109. FIG. 16B shows the values of the operation settings at the time of extraction of the copy prohibition information associated with the setting values of security levels; they are stored in the database 110.

The user checks a radio button 1602 within a security policy dialog box 1601 through the operation portion 105, and then the control portion 101 acquires the values of the operation settings at the time of extraction of the copy prohibition information corresponding to the selected security level. In this way, it is possible for the manager of the copying machine to make the operation settings at the time of extraction of the copy prohibition information at a time according to the security policy.

(Example of Output Operation)

Figure 7B:
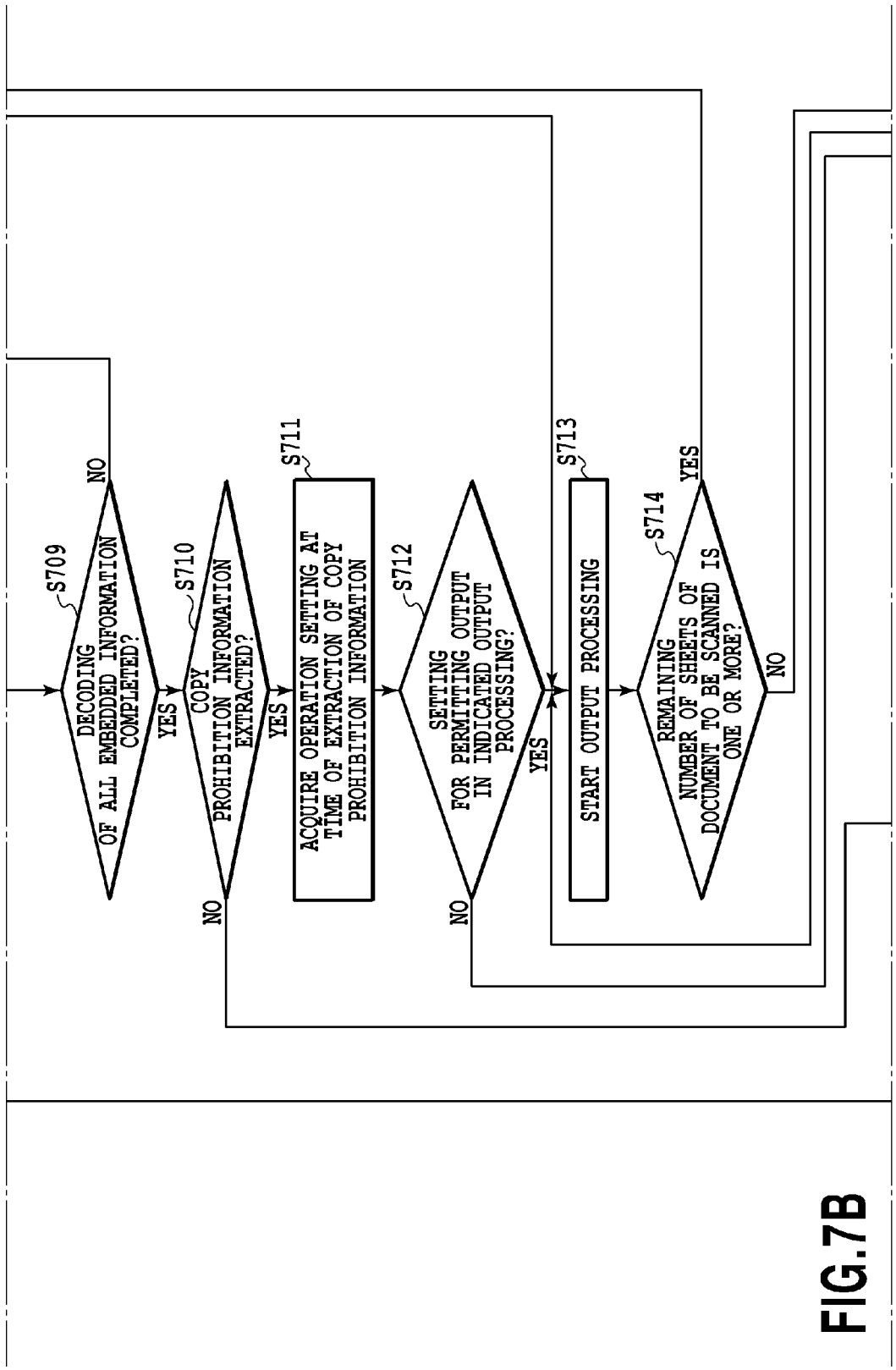
Figure 7C:
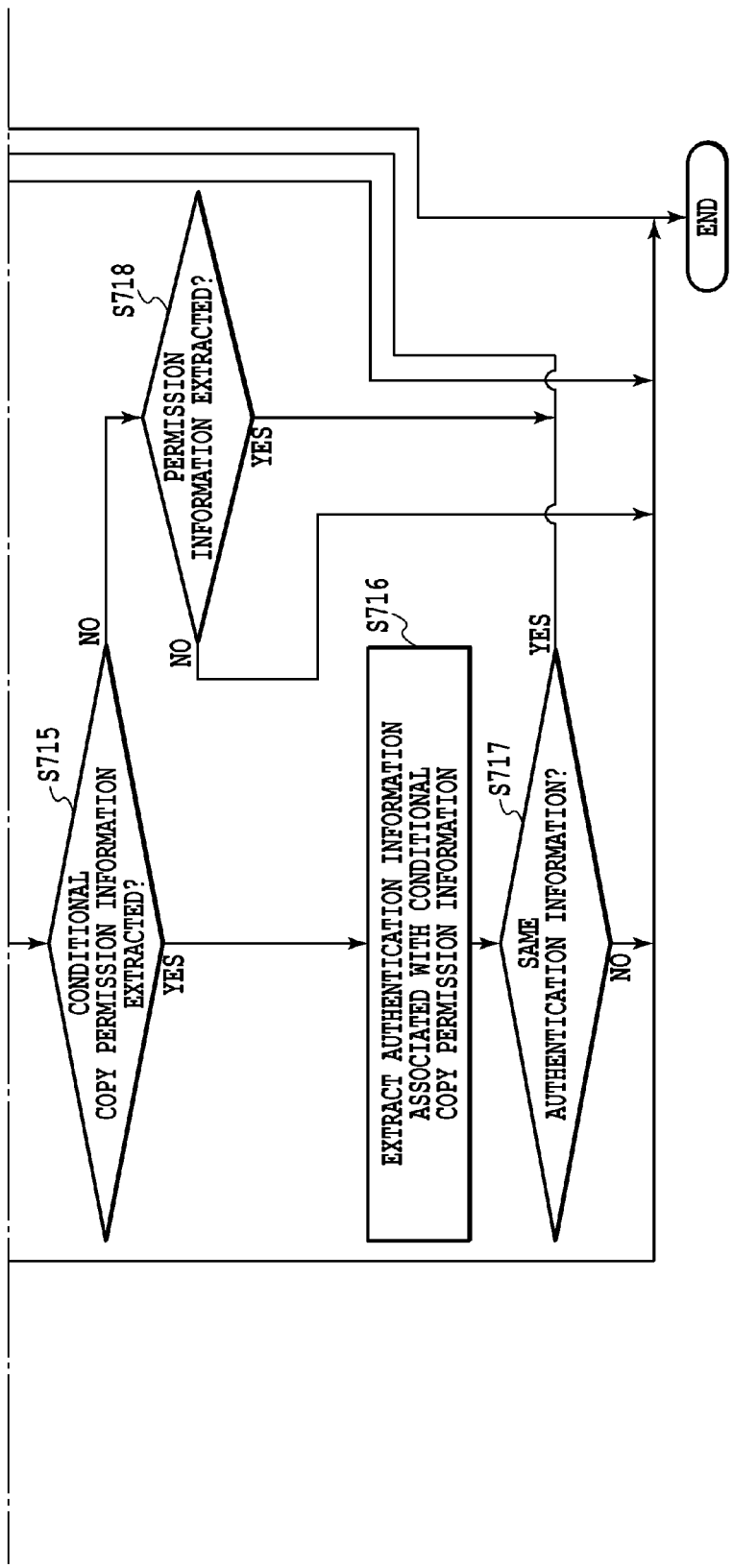

An example of an output operation performed by the MFP3001 will now be described in detail with reference to flowcharts shown in FIGS. 7A-7C. Here, output processing refers to output such as by the copying function, the function of storing in the storage, the function of e-mail transmission or the function of facsimile transmission of the MFP3001.

The user who desires to output a document combined with barcodes through any one type of output processing first enters a user ID and a password through the operation portion 105 while looking at a setting screen displayed on the display portion 109. The information entered through the operation portion 105 is sent from the operation portion 105 to the user authentication portion 106. The user authentication portion 106 determines, according to managed information, whether or not the entered password is an appropriate password (S701).

In step S701, if the user authentication portion 106 does not determine that the password is an appropriate password (no in S701), the MFP3001 stands by until an appropriate password is entered.

If, in step S701, the user authentication portion 106 determines that the password is an appropriate password (yes in S701), the user authentication portion 106 transmits, to the control portion 101, information indicating that the password is an appropriate password and the user ID. The control portion 101, having received the information indicating that the password is an appropriate password and the user ID, displays, on the display portion 109, information indicating that an output start instruction can be notified to the user.

Then, the user enters the output start instruction through the operation portion 105 (S702). Note that the output start instruction includes an instruction indicating through which type of output processing output is performed. Then, the operation portion 105 transmits, to the control portion 101, information indicating the start of output and information indicating the instructed type of output processing. The control portion 101, having received the information, performs control such that the reading portion 102 reads the document. A document image generated by the reading portion 102 is transmitted to the memory 107 and the informatization portion 103 (S703). If the instructed output processing is copying, when the document image is stored in the memory 107, the control portion 101 starts image processing (for example, halftoning) necessary for the output portion 108 to print for the document image.

Then, the informatization portion 103 finds out the barcode from the document image, and informatizes the found-out barcode to obtain embedded information (S704). As described above, since the processing in S704 is performed N times (for example, 20 times), 20 pieces of embedded information are likely to be obtained at most in S704.

Then, the control portion 101 makes an inquiry to the informatization portion 103 as to whether or not the informatization processing on the barcode performed in step S704 is completed (S705). If the informatization processing on the barcode is not completed, the process returns to the processing in step S704.

If, in step S705, the informatization portion 103 completes the informatization processing on the barcode, the control portion 101 determines whether or not one or more pieces of embedded information are obtained from the document image through the informatization processing on the barcode (S706).

If, in step S706, one or more pieces of embedded information cannot be obtained from the document image (no in S706), the MFP3001 starts to output the document image through the output processing indicated by the user (S713).

If, in step S706, one or more pieces of embedded information are obtained from the document image (yes in S706), the control portion 101 decodes all pieces of information included in a high density region on the embedded information obtained (S707). Then, the control portion 101 obtains the copy control information. The copy control information includes any of the copy prohibition information, the copy permission information and the conditional copy permission information.

Then, the control portion 101 determines whether or not processing for decoding the embedded information is successfully performed (S708).

If, in step S708, the control portion 101 fails to perform the processing for decoding the embedded information (no in S708), the control portion 101 stops the output processing in the MFP3001. In other words, the document image generated by the reading portion 102 is not output.

If, in step S708, the control portion 101 succeeds in performing the processing for decoding the embedded information (yes in S708), the control portion 101 then determines whether or not the decoding of all the embedded information is completed (S709).

If, in step S709, the control portion 101 does not determine that the decoding of all the embedded information is completed (no in S709), the process returns to the processing in step S707.

If, in step S709, the control portion 101 determines that the decoding of all the embedded information is completed (yes in S709), the control portion 101 determines whether or not the copy control information includes the copy prohibition information (S710).

If, in step S710, the control portion 101 determines that the copy control information does not include the copy prohibition information (no in S710), the process moves to step S715.

If, in step S715, the control portion 101 determines that the copy control information includes the conditional copy permission information (yes in S715), the process moves to step S716.

In step S716, the control portion 101 obtains the authentication information included in the conditional copy permission information. In other words, the control portion 101 decodes the embedded information in the low density region.

Then, if the obtained authentication information includes the password, the control portion 101 produces, through the operation portion 105, a display on the display portion 109 so as to request the user to input the same information as the authentication information. If the obtained authentication information does not include the password (for example, all the authentication information is the user ID), it is possible to produce no particular display on the display portion 109. This is because, since the user ID has already been entered for the user authentication, the already entered user ID can be used.

Then, the control portion 101 determines whether or not the information entered by the user is the same as the authentication information obtained in S716 (S717). Here, the processing in S717 for determining whether or not the information entered by the user agrees with the authentication information extracted from the conditional copy permission information is referred to as condition determination processing for the copy permission information.

If, in step S717, as a result of the condition determination processing for the copy permission information performed by the control portion 101, the control portion 101 determines that the entered information agrees with the authentication information (yes in S171), the MFP3001 starts the output of the document image. For example, when the user ID entered by the user in S701 agrees with the acquired authentication information (user ID), the output is started (S713).

If, in step S717, as a result of the condition determination processing for the copy permission information performed by the control portion 101, the control portion 101, when determining that the entered information does not agree with the authentication information (no in S717), stops the output processing of the MFP3001. In other words, the document image generated by the reading portion 102 is not output.

If, in step S715, the control portion 101 determines that the copy control information does not include the conditional copy permission information (no in S715), the process moves to step S718.

If, in step S718, the control portion 101 determines that the copy control information includes the copy permission information (yes in S718), the MFP3001 starts the output of the document image (S713).

If, in step S718, the control portion 101, when determining that the copy control information does not include the copy permission information (no in S718), stops the output operation of the MFP3001. In other words, the document image generated by the reading portion 102 is not output.

If, in step S710, the control portion 101, when determining that the copy control information includes the copy prohibition information (yes in S710), acquires operation setting information on each function at the time of extraction of the copy prohibition information stored in the database 110 (S711). Then, the control portion 101 acquires the operation setting at the time of extraction of the copy prohibition information in the output processing for which the output start is instructed.

Then, the control portion 101 determines whether or not the output processing indicated by the user in the acquired operation setting at the time of extraction of the copy prohibition information is a setting for permitting the output (S712).

If, in step S712, the output processing indicated by the user in the operation setting acquired by the control portion 101 is not a setting for permitting the output (no in step S712), the control portion 101 stops the output processing of the MFP3001. In other words, the document image generated by the reading portion 102 is not output.

If, in step S712, the output processing indicated by the user in the operation setting acquired by the control portion 101 is a setting for permitting the output (yes in step S712), the MFP3001 starts the output of the document image (S713).

Then, in step S714, the control portion 101 determines whether or not the remaining number of sheets of document to be scanned by the reading portion 102 is one or more (S714).

If, in step S714, the remaining number of sheets of document to be scanned by the reading portion 102 is determined to be one or more (yes in S714), the process returns to the processing in S703.

On the other hand, if, in step S714, the remaining number of sheets of document to be scanned by the reading portion 102 is determined not to be one or more (no in S714), the output processing is completed.

What has been described above is the details of the output operation performed by the MFP3001 having the function of preventing unauthorized output. That is, it is possible to switch between the permission and the prohibition of output in each output processing and to flexibly use the copy prohibition function. For example, as shown in FIG. 8A, when the user selects the output processing for copying or storing in the storage, even if the copy prohibition information is extracted from the document image read according to the output start instruction, the document image is output. On the other hand, the document image is not output at the time of the e-mail transmission or the facsimile transmission.

Second Embodiment

A second embodiment is characterized in that, when the conditional copy permission information is extracted, it is possible to set whether or not the condition determination processing for the conditional copy permission information is performed in each output processing for which the output start is instructed.

A procedure by the user for setting each output processing on an operation at the time of extraction of the conditional copy permission information and an operation performed by the MFP3001 based on its setting will first be described in detail with reference to FIG. 8B.

In addition to the radio buttons 802 to 805 shown in FIG. 8A, radio buttons 811 to 814 are added to an operation setting dialog box 810 at the time of extraction of the copy control information shown in FIG. 8B.

The user checks, through the operation portion 105, each of the radio buttons 811 to 814 within the operation setting dialog box 810 at the time of extraction of the copy control information, and thereby can set an operation at the time of extraction of the conditional copy permission information in each output processing. In an example shown in FIG. 8B, when the conditional copy permission information is extracted, in the output processing of copying and storing in the storage, a setting is made such that the output is permitted without the condition determination processing for the conditional copy permission information being performed. On the other hand, in the output processing of the e-mail transmission and the facsimile transmission, a setting is made such that the condition determination processing for the conditional copy permission information is performed. The value of an operation setting at the time of extraction of the conditional copy permission information that is set through the operation portion 105 and that is indicated by the radio buttons 811 to 814 is stored by the control portion 101 as determination information in the database 110.

Although, in the present embodiment, the operation at the time of extraction of the copy prohibition information and the operation at the time of extraction of the conditional copy permission information can be individually set, the present invention is not limited to this. For example, when, in the operation at the time of extraction of the copy prohibition information of the radio button 802, "output permission" is selected, the settings associated with individual types of output processing may be made in an interlocking manner, that is, for example, the output permission of the radio button 811 without the condition determination processing being performed is automatically selected.

The configuration of the MFP3001, the processing for producing the document to which the copy control information is added, the processing for extracting the copy control information and the processing for switching, through setting values, between the permission and the prohibition of the output in each output processing when the copy prohibition information is extracted, other than what have been described, are the same as in the first embodiment.

Figure 9B:
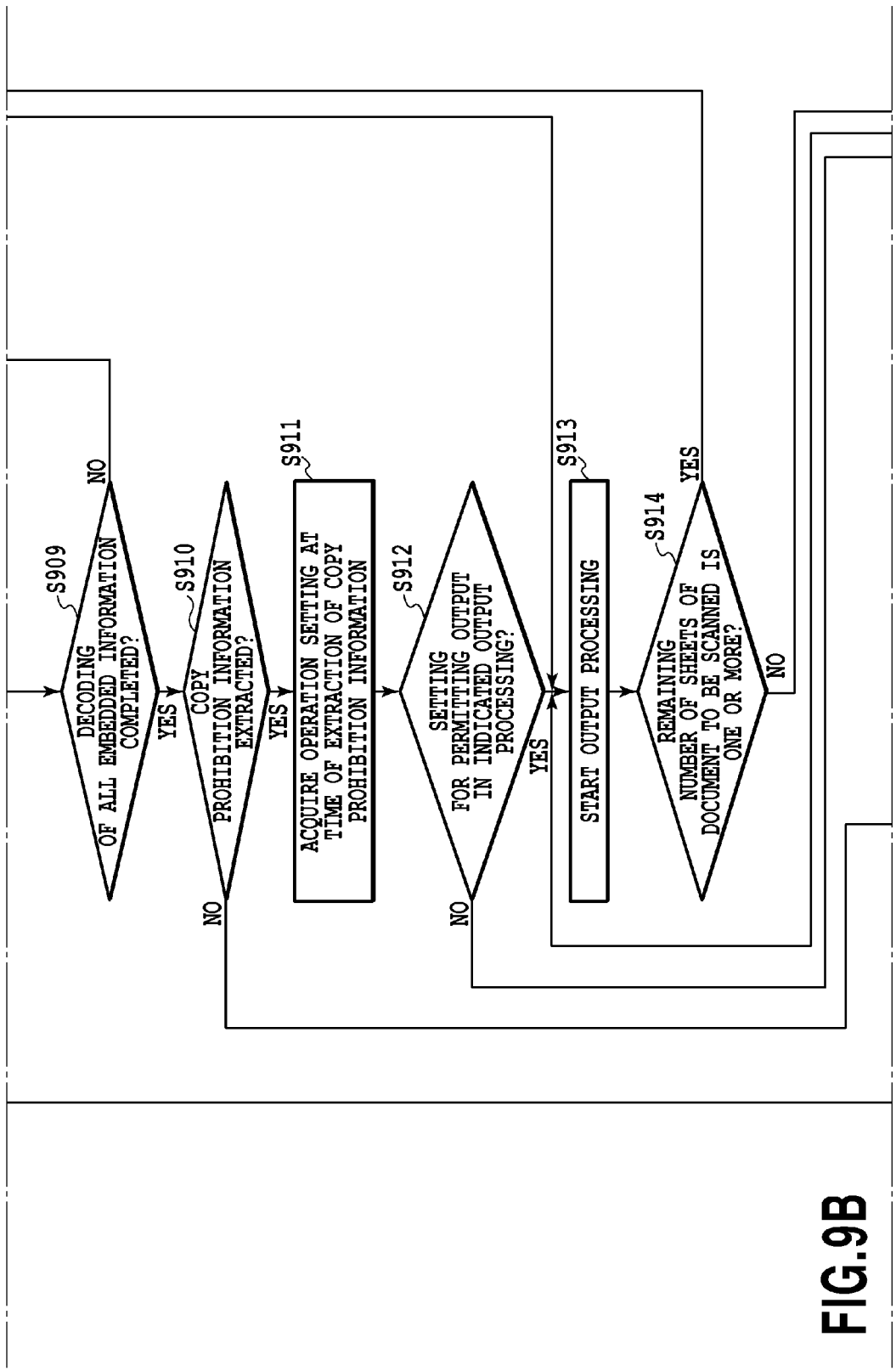
Figure 9C:
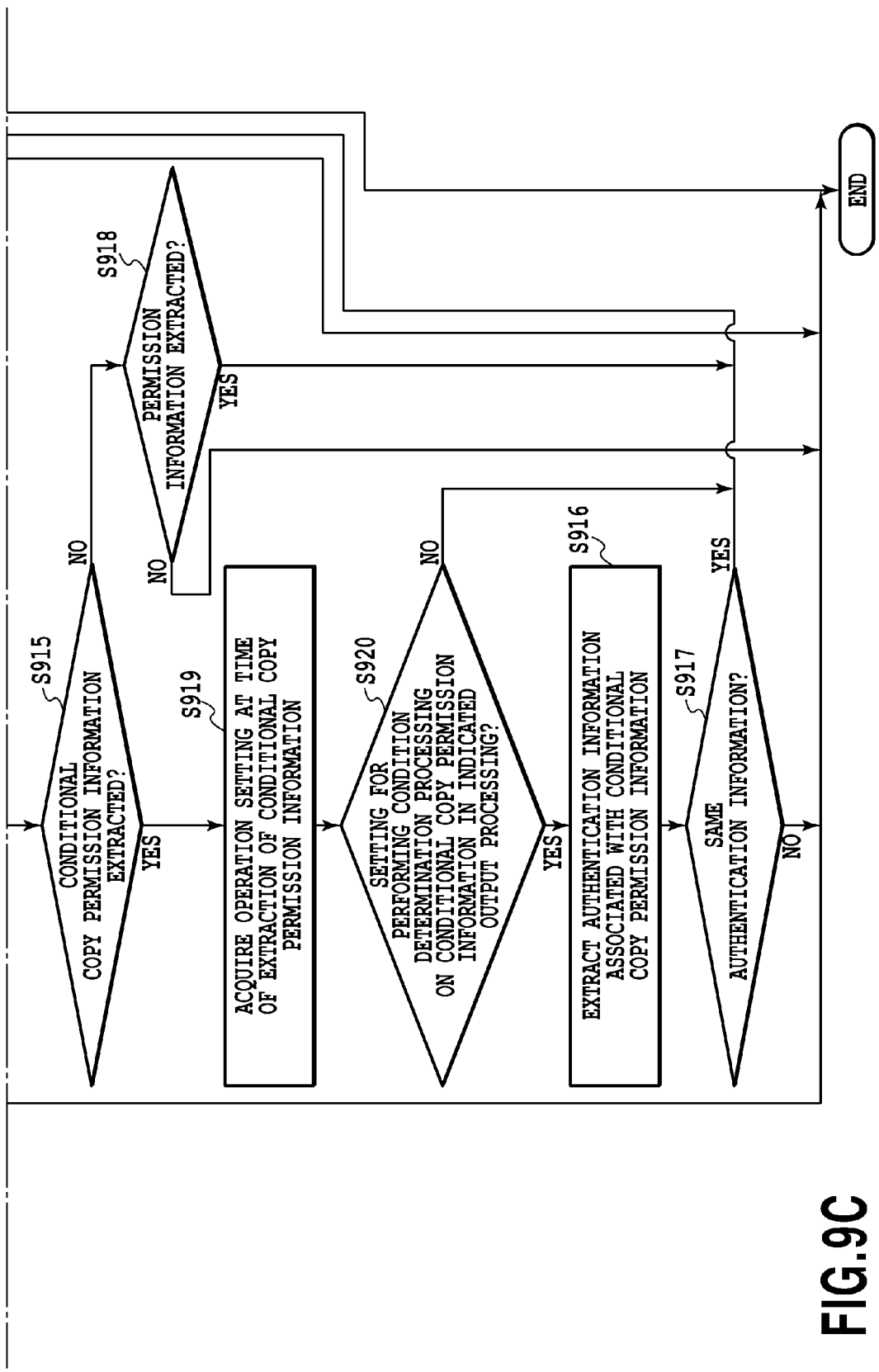

The output operation of the MFP3001 in the second embodiment of the present invention will now be described in detail with reference to FIGS. 9A-9C. This operational procedure is obtained by adding steps S919 and S920 below between steps S715 and S716 in the flowcharts shown in FIG. 7C. The description of the same operations as in the first embodiment is not repeated; only operations different from those in the first embodiment will be described. Control for switching between the permission and the prohibition of the output in each output processing for which the output start is instructed when the document to which the copy prohibition information is added is read is the same as in the first embodiment.

If, in step S915, the control portion 101 determines that the copy control information includes the conditional copy permission information (yes in S915), the process moves to step S919.

In step S919, the control portion 101 obtains an operation setting at the time of extraction of the conditional copy permission information in the output processing for which the output start is instructed (S919).

Then, the control portion 101 determines whether or not, with respect to the output processing for which the output start is instructed, the acquired operation setting at the time of extraction of the conditional copy permission information is the setting for performing the condition determination processing for the conditional copy permission information (S920).

If, in the output processing for which the output start is instructed, the operation setting acquired by the control portion 101 is the setting for performing the condition determination processing for the conditional copy permission information (yes in S920), the control portion 101 obtains the authentication information included in the conditional copy permission information (S916).

On the other hand, if, in the output processing for which the output start is instructed, the operation setting acquired by the control portion 101 is the setting for not performing the condition determination processing for the conditional copy permission information (no in S920), the MFP3001 starts the output of the document image (S913).

This processing enables the MFP3001 to switch whether or not the condition determination processing for the conditional copy permission information is performed in each output processing for which the output start is instructed, and the copy prohibition function can be flexibly used.

For example, in the case of a setting shown in FIG. 8B, even when the output processing of copying or storing in the storage is selected and the conditional copy permission information is extracted from the document image, the output is produced without the condition determination processing for the conditional copy permission information being performed. On the other hand, in the case of the output processing of the e-mail transmission or the facsimile transmission, the condition determination processing for the conditional copy permission information is performed.

Third Embodiment

A third embodiment of the present invention will now be described. In the first embodiment and the second embodiment, when the document to which the copy prohibition information or the conditional copy permission information is added is read, control is switched in each of different types of output processing.

In the third embodiment, in the e-mail transmission or the facsimile transmission, an operation is performed such that transmission to the outside is prohibited whereas transmission in-house and transmission to a group company are permitted. In other words, in the third embodiment, when the copying machine performs the e-mail transmission or the facsimile transmission, whether or not to perform the output is controlled based on the result of comparison of the address of transmission previously registered in the copying machine with the address of a destination specified by the user.

Portions of the third embodiment different from those of the second embodiment will be described.

Radio buttons 821 to 824 of an operation setting dialog box 820 at the time of extraction of the copy control information shown in FIG. 8C are obtained by combining the radio buttons 802 to 805 and 811 to 814 shown in FIG. 8B into one. Detail setting buttons 825 and 826 are further added to the operation setting dialog box 820 at the time of extraction of the copy control information.

Figure 10A:
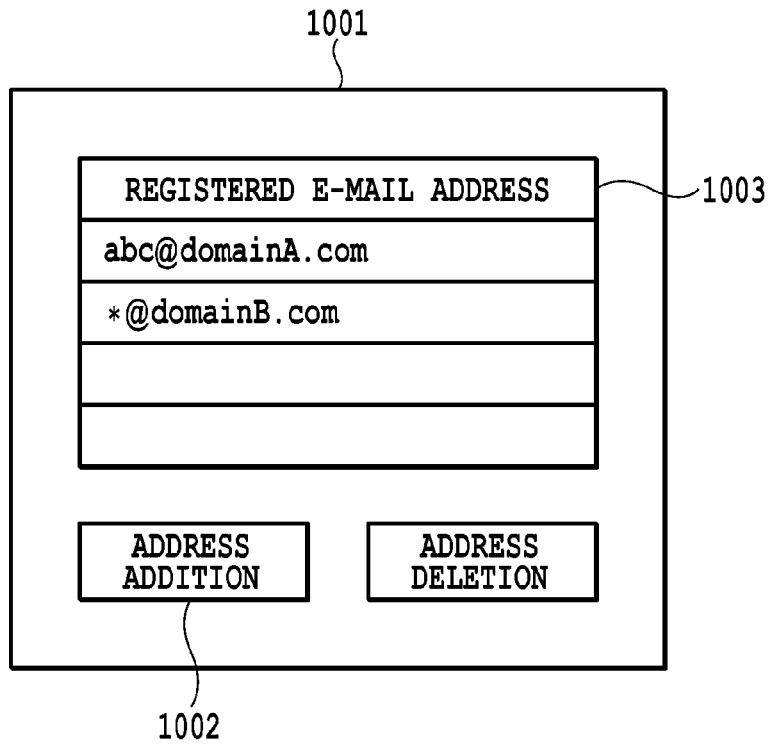
FIGS. 10A and 10B are diagrams showing an example of a screen for setting a destination on which an operation setting is made at the time of extraction of the copy control information.

The user checks, through the operation portion 105, the radio button 823 "copy prohibition information: output permission, conditional copy permission information: without condition determination processing" within the operation setting dialog box 820 at the time of extraction of the copy control information, and thereby can select the detail setting button 825. The user selects, through the operation portion 105, the detail setting button 825, and thus an image shown in FIG. 10A is displayed on the display portion 109. As described above, the present embodiment is characterized in that "conditional copy permission information: without condition determination processing" is set to "copy prohibition information: output permission". Since, even when the copy prohibition information is present, the output is permitted, the output should be permitted even when the conditional copy permission information is present. Since it is meaningless to perform the condition determination processing, the condition determination processing is not performed so that the amount of processing is reduced. The reason why "conditional copy permission information: with condition determination processing" is set to "copy prohibition information: output permission" is the same as described above. In other words, since, even when the copy prohibition information is present, the output is prohibited, a determination should be made as to whether or not the output is prohibited when the conditional copy permission information is present.

Although, in FIG. 8C, a display is produced such that these are set, it is actually unnecessary to display the setting on the conditional copy permission information on the display screen. Even if the display is not produced, when the user sets "copy prohibition information: output permission", "conditional copy permission information: without condition determination processing" is assumed to be set. When the user sets "copy prohibition information: output prohibition", "conditional copy permission information: with condition determination processing" may be assumed to be set.

FIG. 10A shows an interface screen for setting, through the operation portion 105, an address that is the output destination of an e-mail which is permitted to be output. The user presses down, through the operation portion 105, a button 1002 within an e-mail registration dialog box 1001, and thus an e-mail address entry dialog box is displayed (not shown). Then, the user enters, through the operation portion 105, the e-mail address which is permitted to be output. The e-mail address may be registered one by one or may be registered on an individual domain basis. Then, when only the domain is registered, all the e-mail addresses of the domain are target addresses.

The entered e-mail address is stored by the control portion 101 as a destination list in the database 110, and is displayed in an address list 1003.

Likewise, the user checks, through the operation portion 105, the radio button 824 "copy prohibition information: output permission, conditional copy permission information: without condition determination processing" within the operation setting dialog box 820 at the time of extraction of copy control information, and thereby can select a detail setting button 826. When the user selects the detail setting button 826 through the operation portion 105, an image shown in FIG. 10B is displayed on the display portion 109.

Figure 10B:
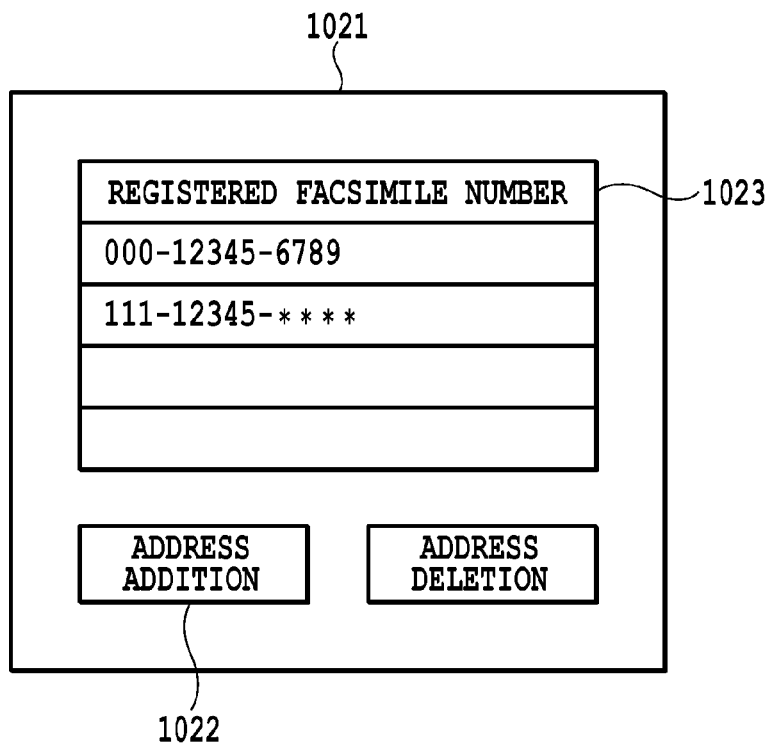
Figure 11B:
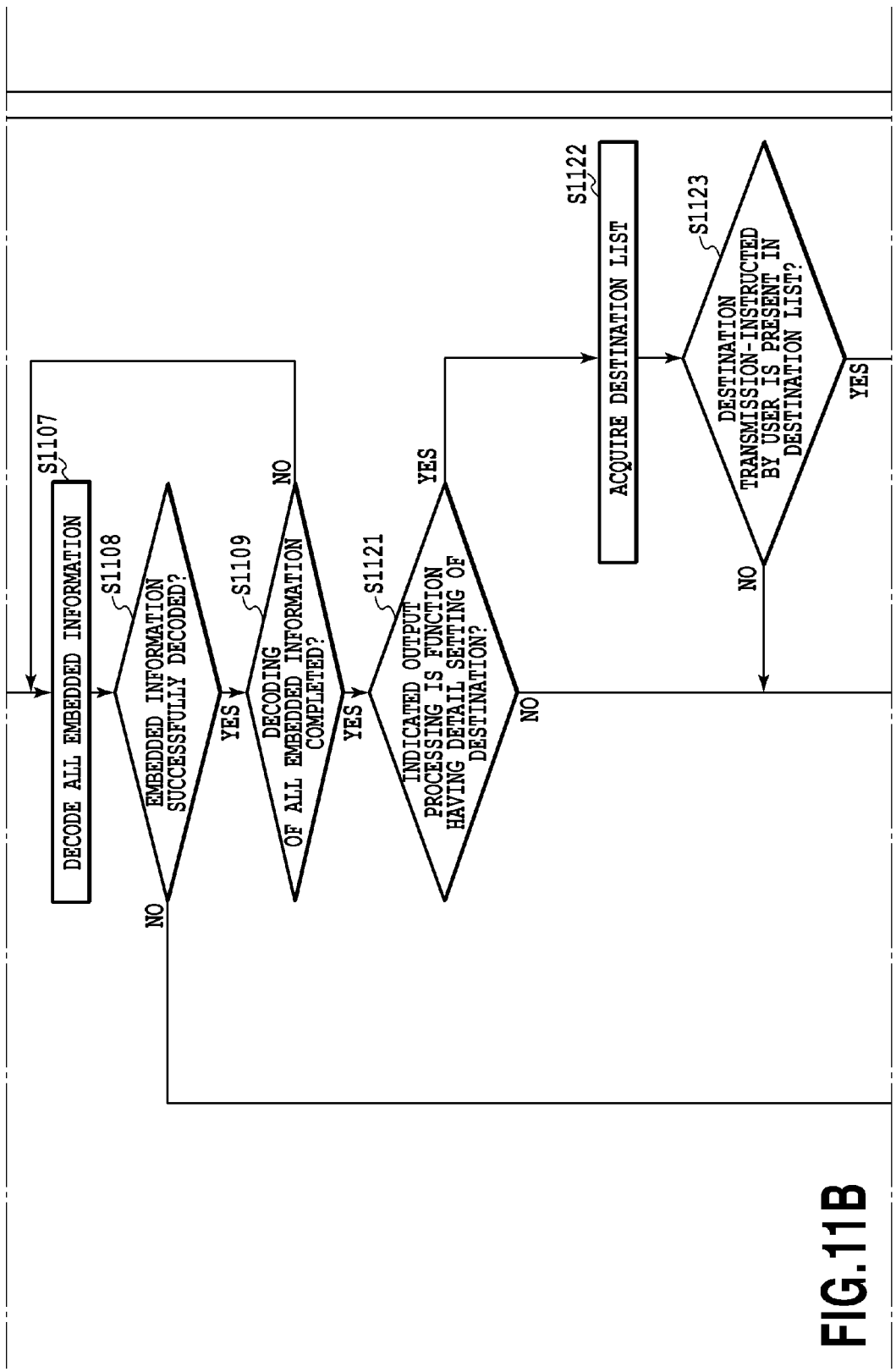
Figure 11C:
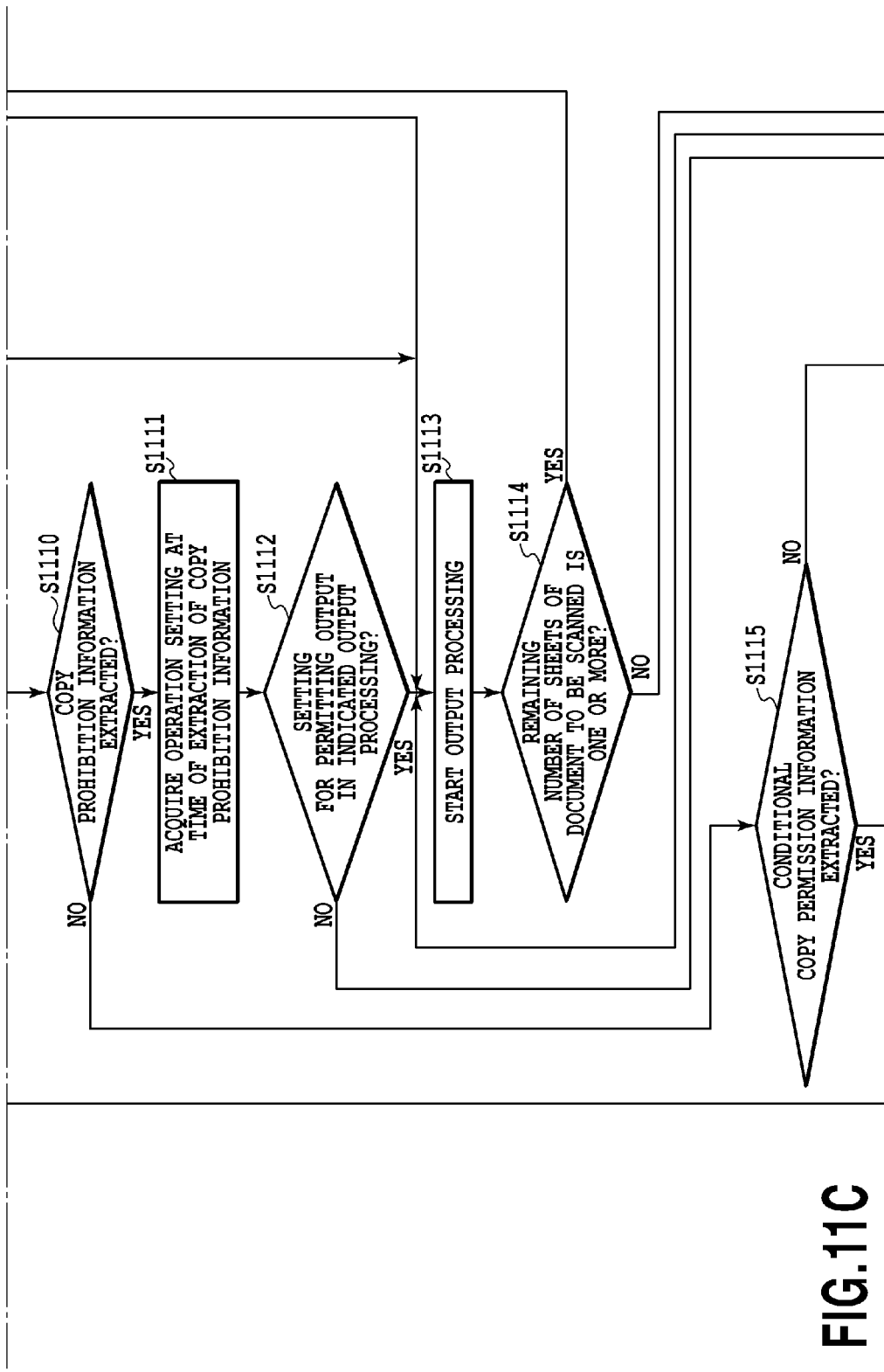
Figure 11D:
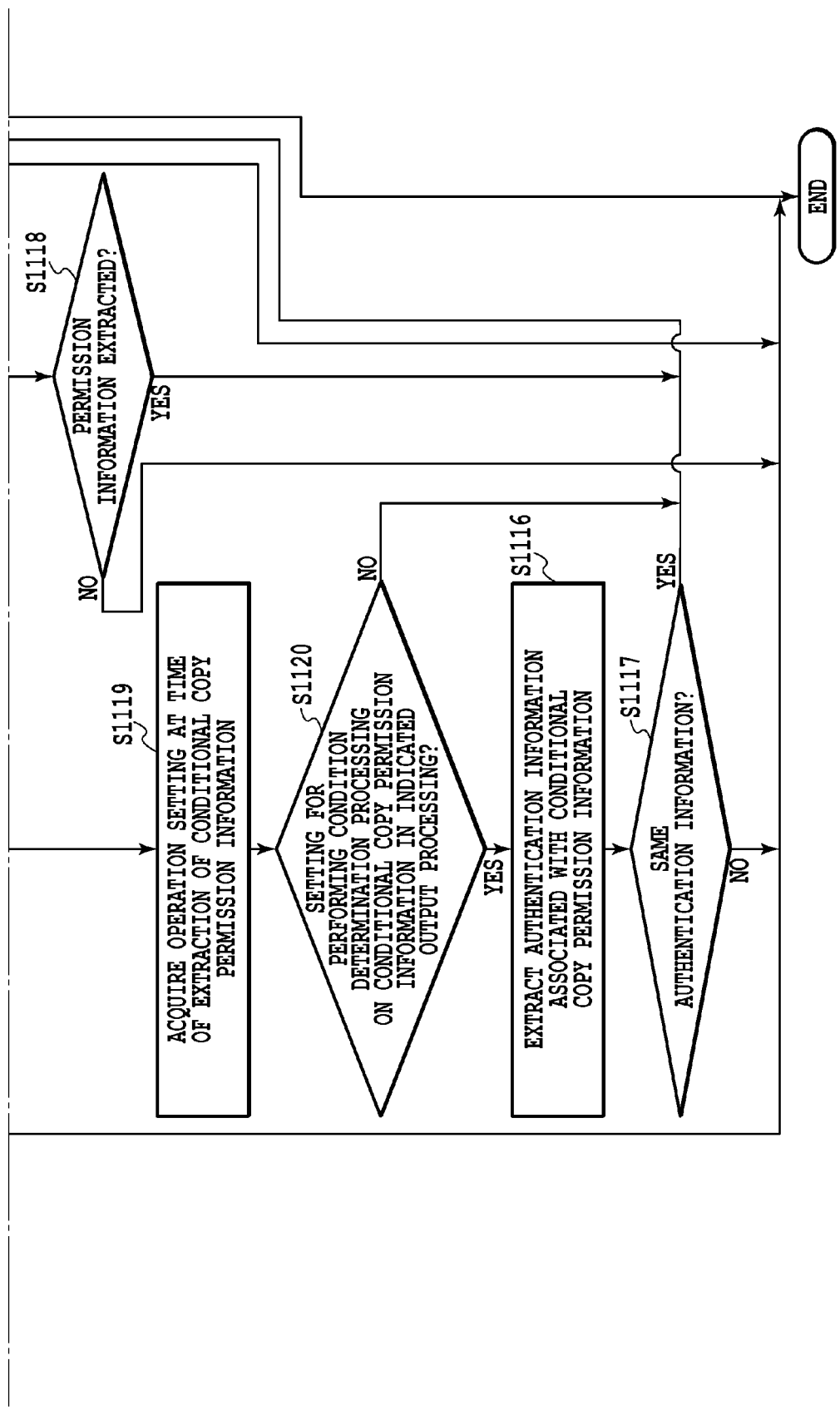
Figure 13B:
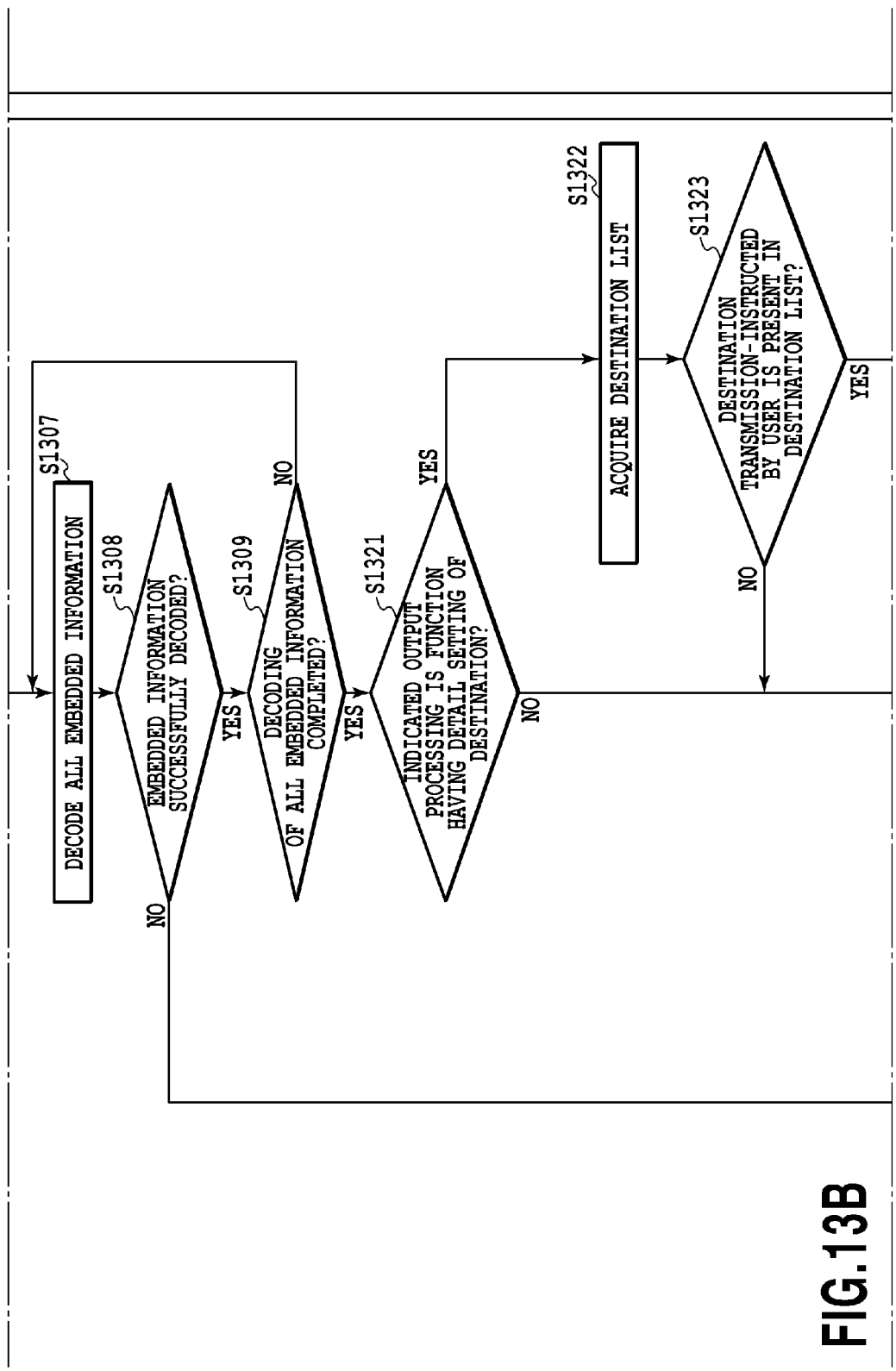
Figure 13C:
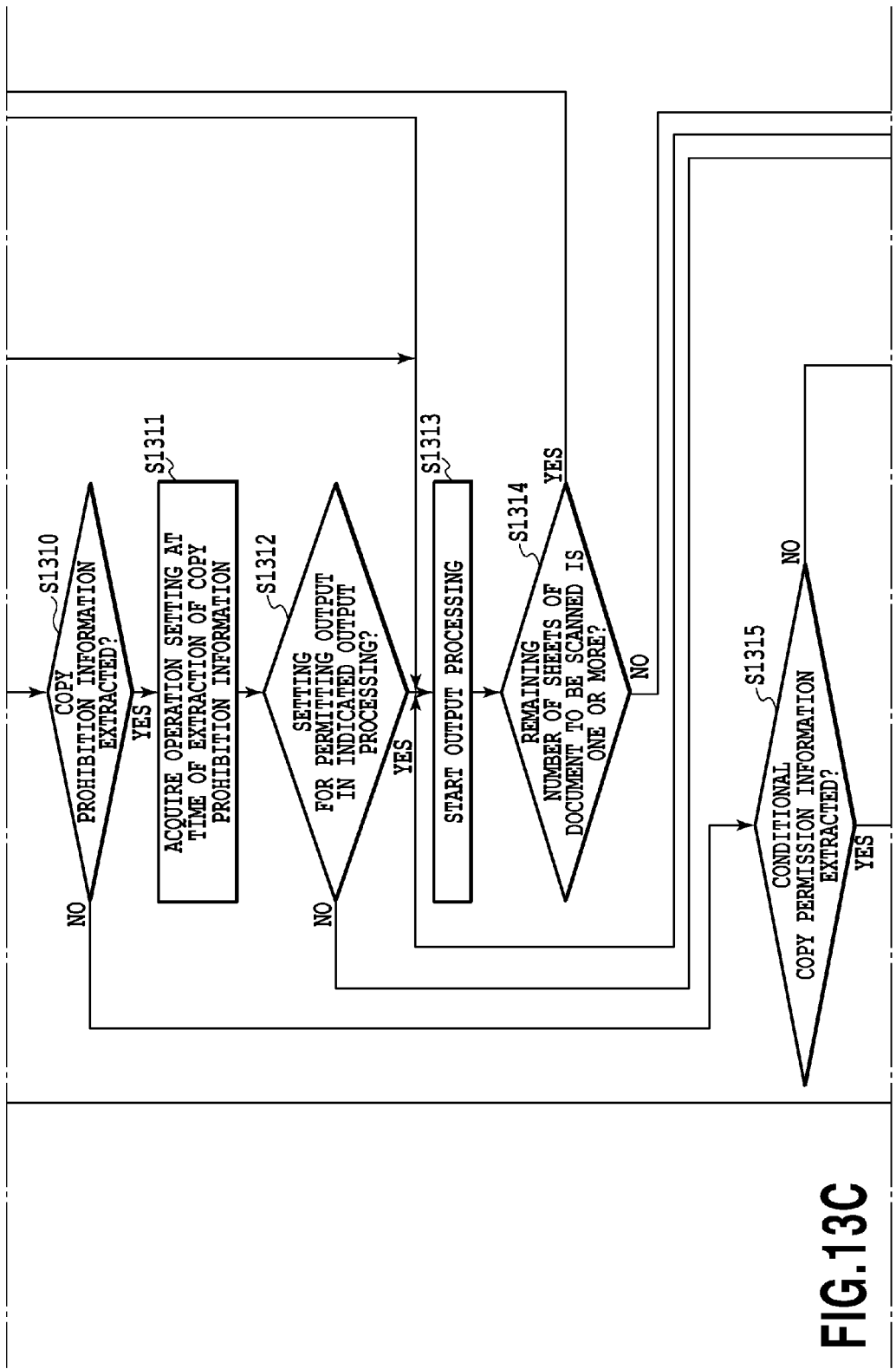
Figure 13D:
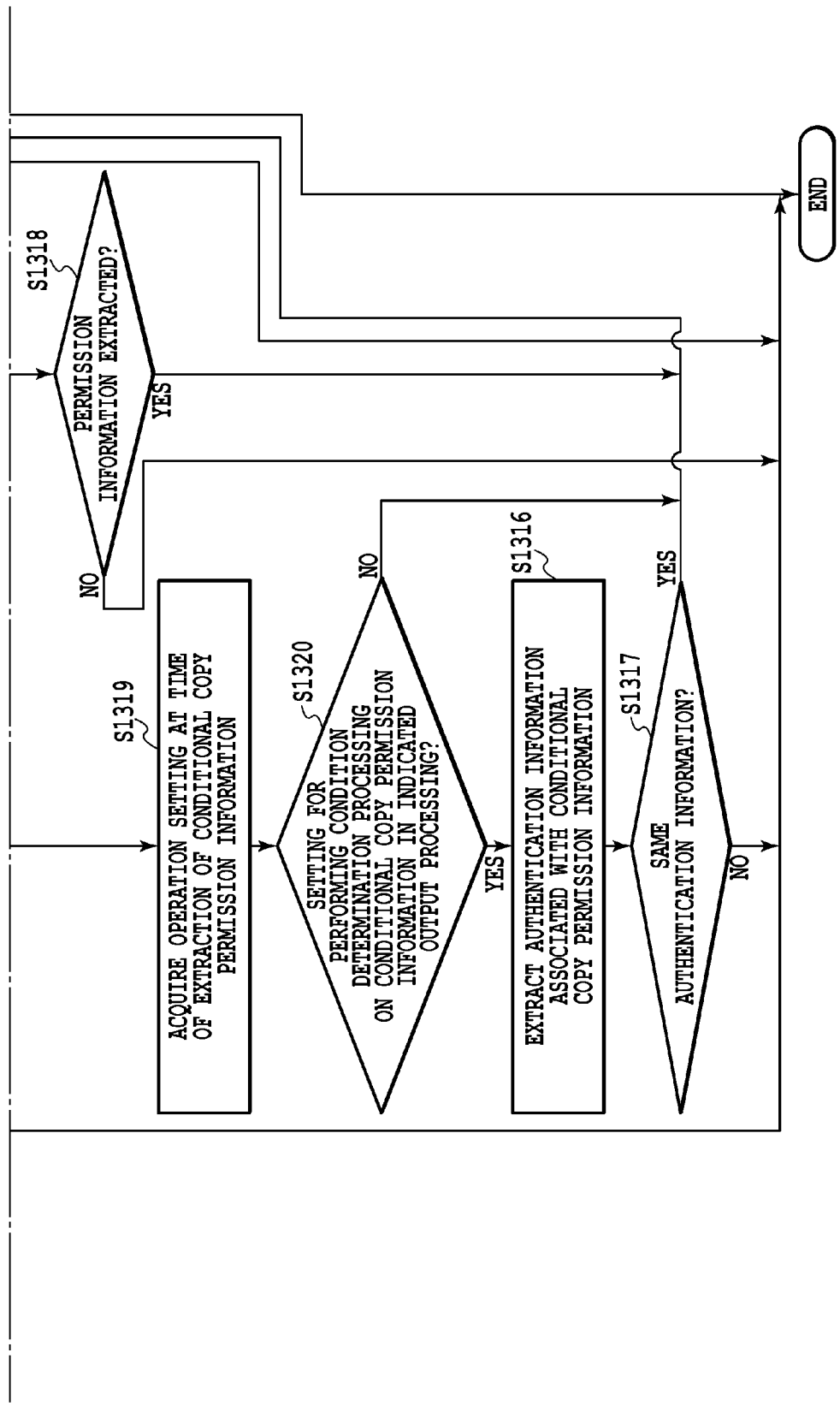
Figure 15B:
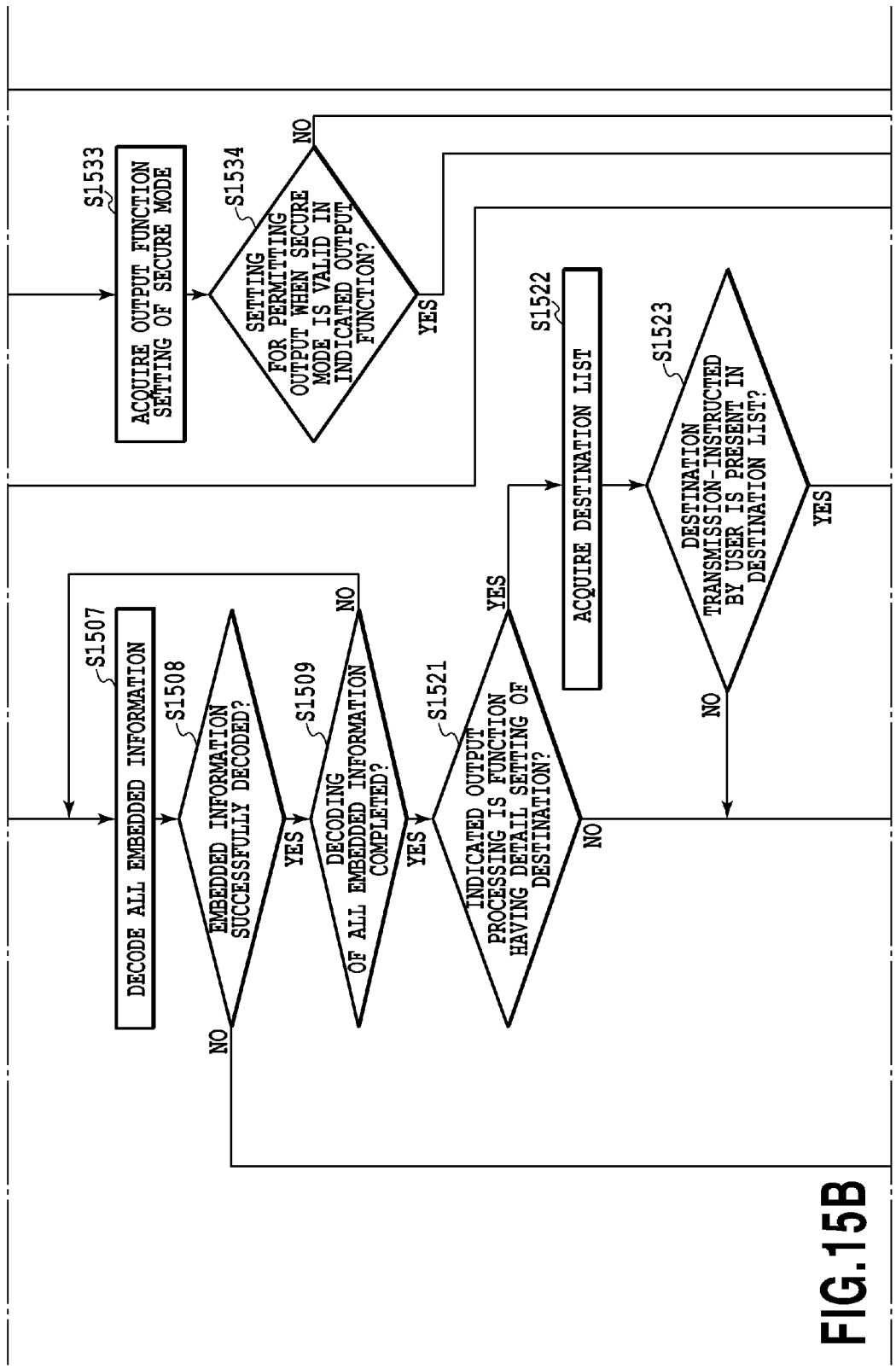
Figure 15D:
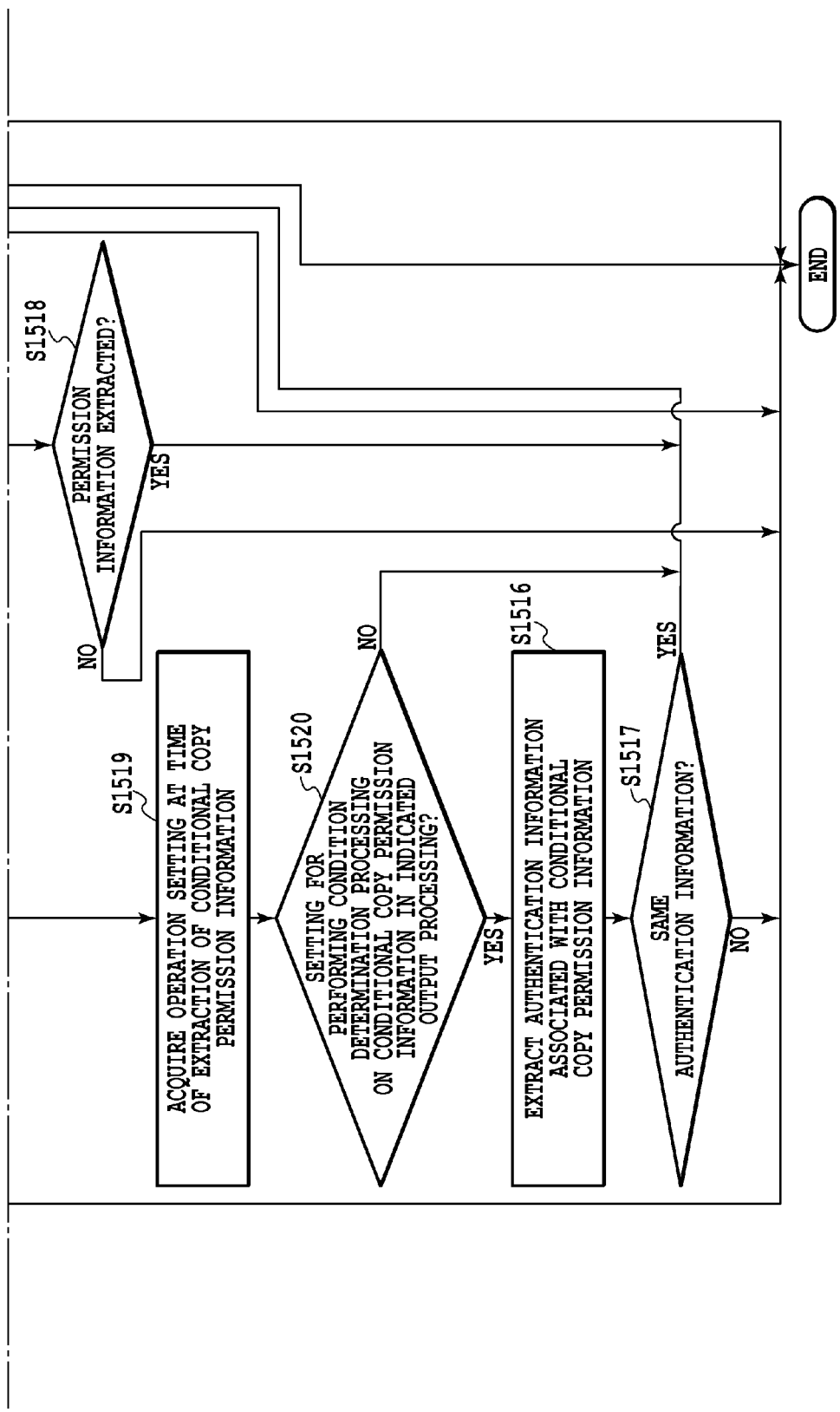

FIG. 10B shows an interface screen for setting, through the operation portion 105, a facsimile number that is permitted to be output. The user presses down, through the operation portion 105, a button 1022 within a facsimile number dialog box 1021, and thus a facsimile number entry dialog box is displayed (not shown). Then, the user enters, through the operation portion 105, the facsimile number which is permitted to be output. The facsimile number may be registered one by one or may use a wild card to register a plurality of numbers.

The entered facsimile number is stored by the control portion 101 as a destination list in the database 110, and is displayed in a facsimile number list 1023.

The configuration of the MFP3001, the processing for producing the document to which the copy control information is added, the processing for extracting the copy control information and the processing for switching, through setting values, between the permission and the prohibition of the output in each output processing when the copy prohibition information is extracted, other than what have been described, are the same as in the first embodiment.

The output operation performed by the MFP3001 of the third embodiment of the present invention will now be described in detail with reference to FIGS. 11A-11D. This operational procedure is obtained by further adding steps S1121, S1122 and S1123 below between steps S909, S910 and S913 in the flowchart shown in FIG. 9B.

Only operations that are different from those in the third embodiment due to the addition of the above steps will be described below.

If, in step S1109, the control portion 101 determines that the decoding of all embedded information is completed, the control portion 101 determines whether or not the detailed settings of a destination are made in the indicated output processing (S1121).

If, in step S1121, the control portion 101 determines that the detailed settings are not made in the specified output processing (no in S1121), the process moves to processing in step 1110.

If, in step S1121, the control portion 101, when determining that the detailed settings are made in the specified output processing, acquires, from the database 110, the destination list of the output processing for which the output start is instructed. Then, a determination is made as to whether or not the address of a transmission instruction is present in the destination list when the user instructs the output start (S1123).

If, in step S1123, the control portion 101 determines that the address for which the user instructs the output start is present in the destination list (yes in S1123), the MFP3001 starts the output of the document image (S1113).

On the other hand, if, in step S1123, the control portion 101 determines that the address for which the user instructs the output start is not present in the destination list (yes in S1123), the process moves to the processing in step S1110.

As described above, in the third embodiment, whether or not the output is produced can be switched according to the address of the destination. For example, transmission to the outside is prohibited but transmission in-house and transmission to a group company are permitted; the setting for prohibiting copying can be flexibly made.

Fourth Embodiment

A fourth embodiment of the present invention will now be described. In the first to third embodiments, even when the copy control information such as the copy prohibition information or the conditional copy permission information is added to the input document, the document image is output as it is depending on the operation setting of the output processing.

However, it can be considered that, in the output processing specified by the user, the processing for extracting the copy control information is unnecessary. For example, since, in storing in the storage, image data is stored, as digital data, along with barcode information, it is necessary to extract the copy control information whereas, since in copying they are output only as a paper medium, it is not necessary to extract the copy control information.

As described above, in the fourth embodiment, an operation for switching whether or not to perform processing for extracting the copy control information according to the output processing for which the user instructs the output start will be described.

Portions different from those in the third embodiment will first be described.

FIG. 12 is a screen showing extraction setting information for setting, in each output processing, an operation for determining whether or not to extract the copy control information, and is displayed on the display portion 109.

The user checks, through the operation portion 105, each of radio buttons 1202 to 1205 within an extraction execution setting dialog box 1201, and thereby can set, in each output processing, the operation for determining whether or not to extract the copy control information. This extraction execution setting dialog box 1201 can be set and changed by only the user who has the authority to manage the copying machine; general users and guest users cannot change setting values. This setting has default values, and, when the manager user does not change the setting, such setting values are used. In the example shown in FIG. 12, a setting is made such that, the copy control information is not extracted only in the copying but the copy control information is extracted in the storing in the storage, the e-mail transmission and the facsimile transmission. The values that are set by checking the radio buttons 1202 to 1205 through the operation portion 105 are stored by the control portion 101 as an extraction execution setting for the copy control information in the database 110.

The output operation performed by the MFP3001 of the fourth embodiment of the present invention will now be described in detail with reference to FIGS. 13A-13D. This operational procedure is obtained by further adding steps S1324 and S1325 between steps S1103 and S1104 in the flowchart shown in FIG. 11A.

Operations that are different from those in the third embodiment due to the addition of the above steps will be described below.

The control portion 101 acquires the extraction setting information from the database 110 (S1324).

Then, the control portion 101 determines, based on the acquired extraction setting information, whether or not to extract the copy control information in the output processing for which the output start is instructed (S1325).

If, in step S1325, the control portion 101 determines that the output processing for which the output start is instructed is the setting for extracting the copy control information (yes in S1325), the informatization portion 103 finds out the barcode from the document image. Then, the found-out barcode is informatized, and thus the embedded information is obtained (S1304).

On the other hand, if, in step S1325, the control portion 101 determines that the output processing for which the output start is instructed is not the setting for extracting the copy control information (no in S1325), the MFP3001 starts the output of the document image (S1313).

In the fourth embodiment, it is possible to switch whether or not to extract the copy control information in each output processing, and to omit processing for extracting unnecessary copy control information depending on the output processing.

In the embodiments described above, the high density region and the low density region are provided, and more important information is included in the high density region. Thus, it is possible to obtain the effect of increasing the possibility that the more important information is accurately extracted from the document. However, without a difference in density of each region being provided, all regions within the barcode may have the same density.

Fifth Embodiment

A fifth embodiment will now be described.

Although, in the first to fourth embodiments described above, the barcode is used, in the fifth embodiment, a QR code (registered trademark) is used.

Since a barcode is only added to part of the document by the QR code, when a malicious user removes or fills in the QR code in the document, the copy control information of the barcode is lost, and thus it is impossible to prohibit copying.

Hence, when copy prohibition is performed in the copying machine, and the QR code is used, if the QR code cannot be found out from the document, and the embedded information cannot be obtained, the copying may be prohibited. In the fifth embodiment, this operation setting of the copying machine is referred to as a secure mode.

In the fifth embodiment, when the secure mode is valid in the copying machine, the permission or the prohibition of the output in each output processing is switched, and thus the output is permitted even if the QR code cannot be found out depending on the output processing.

Portions that are different from those in the third embodiment will first be described.

FIG. 14 is an interface screen for setting the validation and the invalidation of the secure mode and performing the operation setting of each type of output processing, and it is displayed on the display portion 109.

The user checks, through the operation portion 105, a radio button 1402 within a secure mode setting dialog box 1401, and thereby can switch between the validation and the invalidation of the secure mode.

If the secure mode is made valid, radio buttons 1402 to 1405 within the secure mode setting dialog box can be checked.

If the user checks, through the operation portion 105, each of the check boxes 1402 to 1405 but cannot find out the QR code from the document and obtain the embedded information, the user can set whether or not to permit or prohibit the output.

This secure mode setting dialog box 1401 can be set and changed by only the user who has the authority to manage the copying machine; general users and guest users cannot change setting values. This setting has default values, and, when the manager user does not change the setting, such setting values are used. In FIG. 14, a setting is made such that the output is permitted in the copying and the storing in the storage whereas, in the e-mail transmission and the facsimile transmission, the output is prohibited.

The values that are set by checking the radio buttons 1402 to 1405 through the operation portion 105 are stored by the control portion 101 as the output function setting of the secure mode in the database 110.

FIGS. 15A-15D are flowcharts showing the output processing performed by the MFP3001. This operational procedure is obtained by further adding steps S1530, S1531, S1532 and S1533 between steps S1106 and S1113 in the flowcharts shown in FIGS. 11A and 11B.

Only operations that are different from those in the third embodiment due to the addition of the above steps will be described below.

The QR code is different from the barcode described in the first to fourth embodiments; with a cutout symbol (finder pattern) in a corner of the barcode, the detection of the position of the barcode is performed.

If, in step S1506, the informatization portion 103 cannot obtain one or more pieces of embedded information from the document image, the control portion 101 acquires the setting of the secure mode from the database 110 (S1531).

Then, the control portion 101 determines whether or not the setting of the secure mode is valid (S1532).

If, in step S1532, the setting of the secure mode is invalid (no in S1532), the MFP3001 starts the output of the document image (S1513).

On the other hand, if, in step S1532, the setting of the secure mode is valid (yes in S1532), the control portion 101 acquires the output function setting of the secure mode from the database 110 (S1533).

Then, the control portion 101 determines, from the acquired output function setting of the secure mode, whether or not the output processing for which the user instructs the output start is the setting for permitting the output when the secure mode is valid (S1534).

If, in step S1534, the output processing for which the user instructs the output start is the setting for permitting the output when the secure mode is valid (yes in S1534), the MFP3001 starts the output of the document image (S1513).

On the other hand, if, in step S1534, the output processing for which the user instructs the output start is the setting for prohibiting the output when the secure mode is valid (no in S1534), the control portion 101 stops the output operation of the MFP3001. In other words, the copying of the document image generated by the reading portion 102 is not performed.

As described above, if, as in the fifth embodiment, the MFP3001 cannot obtain the embedded information when the secure mode is valid, it is possible to switch the permission and the prohibition of the output and to flexibly use the copy prohibition function in the secure mode.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-145435, filed Jun. 25, 2010, which is hereby incorporated by reference herein in its entirety.

What is claimed is:

1. A device including an output unit configured to output a document image using one output type selected from a plurality of output types, the device comprising:
   a holding unit configured to hold a setting as to whether or not to permit each type of the plurality of output types;
   a reception unit configured to receive, from a user, a specification as to which output type is to be used;
   a reading unit configured to read a document to obtain a document image after the reception of the specification;
   a first determination unit configured to determine, after the document is read, whether or not the obtained document image includes output inhibition information;
   a second determination unit configured to determine, after the document is read, whether or not the output type specified by the user is permitted according to the setting in the holding unit; and
   a control unit configured to control the output unit, after the determinations by the first and second determination units,
      to output the document image with the specified output type, in a case that the obtained document image has been determined to include the output inhibition information and the specified output type has been determined to be permitted, and
      not to output the document image in the specified output type, in a case that the obtained document image has been determined to include the output inhibition information and the specified output type has been determined not to be permitted.

2. The device of claim 1, further comprising:
   a request unit configured to request the user to input authentication information when the output inhibition information includes conditional copy permission information,
   wherein the control unit performs authentication verification as to whether or not the authentication information input by the user agrees with that included in the conditional copy permission information, and, when they agree with each other, the document image is output based on the output type specified by the user.

3. The device of claim 2,
   wherein the holding unit holds determination information associating each of the plurality of output types with whether or not to perform the authentication verification, and
   the control unit determines, based on the output type specified by the user and the determination information, whether or not to perform the authentication verification.

4. The device of claim 2,
   wherein the authentication information is a user ID or a password.

5. The device of claim 1,
   wherein the holding unit further holds a transmission destination that is permitted to be an output destination of the document image,
   the reception unit receives the transmission destination of the document image from the user, and
   when the reception unit receives the transmission destination of the document image, the control unit outputs the document image to the transmission destination based on the output type specified by the user, if the transmission destination is held by the holding unit.

6. The device of claim 5,
   wherein the transmission destination is identified from an e-mail address or a facsimile number.

7. The device of claim 1,
   wherein the holding unit holds extraction setting information associating each of the plurality of output types with whether or not to perform determination as to whether or not the document image includes the output inhibition information, and
   the first determination unit performs determination as to whether or not the document image includes the output inhibition information when the extraction setting information indicates that the output type specified by the user is to be used.

8. The device of claim 1,
   wherein the output types for which the output unit is configured to output the document image are copying of the document, storing of the document image in a storage, transmission of the document image in an e-mail and transmission of the document image via facsimile.

9. The device of claim 1,
   wherein the holding unit holds a security policy that previously determines whether or not to permit output using the plurality of output types, and
   the setting in the holding unit is determined based on the security policy specified by the user.

10. The device according to claim 1, wherein
    the control unit is configured to output the document image with the specified output type in a case that the obtained document image has been determined not to include the output inhibition information and the specified output type is inhibited.

11. A control method for a device including an output unit configured to output a document image using one output type selected from a plurality of output types, the method comprising:
    a holding step of holding a setting as to whether or not to permit each output type of the plurality of output types;
    a reception step of receiving, from a user, a specification as to which output type is to be used;
    a reading step of reading a document to obtain a document image, after the reception step;
    a first determination step of determining whether or not the obtained document image includes output inhibition information, after the reading step;
    a second determination step of determining whether or not the output type specified by the user is permitted according to the setting, after the reading step; and
    a control step of controlling the output unit, after the determinations in the first and second determination steps,
       to output the document image with the specified output type, in a case that the obtained document image includes the output inhibition information and the specified output type has been determined to be permitted, and
       not to output the document image with the specified output type, in a case that the obtained document image has been determined to include the output inhibition information and the specified output type has been determined not to be permitted.

12. A non-transitory computer-readable medium that records a program for causing a computer to execute the control method according to claim 11.

13. The method according to claim 11, wherein
    the control step controls the output unit to output the document image with the specified the output type in a case that the obtained document image has been determined not to include the output inhibition information and the specified output type is inhibited.

14. A device including an output unit configured to output a document image using one output type selected from a plurality of output types, the device comprising:

a holding unit configured to hold a setting as to whether or not to permit each output type of the plurality of output types;

a reception unit configured to receive, from a user, a specification as to which type of output type is to be used;

a reading unit configured to read a document to obtain a document image, after the reception by the reception unit;

a first determination unit configured to determine, after the reading by the reading unit, whether or not the obtained document image includes output inhibition information or conditional output permission information;

a second determination unit configured to determine, after the reading by the reading unit, whether or not the output type specified by the user is permitted according to the setting; and a control unit configured to control the output unit, after the determinations of the first and second determination units, to output the document image with the specified output type, in a case that the obtained document image has been determined to include the output inhibition information and the specified output type has been determined to be permitted, not to output the document image with the specified output type, in a case that the obtained document image has been determined to include the output inhibition information and the specified output type has been determined not to be permitted, to output the document image with the specified output type, in a case that the obtained document image has been determined not to include the output inhibition information or the conditional output permission information and the specified output type has been determined to be inhibited, and to output the document image with the specified output type, in a case that the obtained document image has been determined to include the conditional output permission information and the specified output type has been determined to be permitted, without determining whether a condition of the conditional output permission information is satisfied.

* * * * *